(12) United States Patent
Smith

(10) Patent No.: US 7,769,290 B2
(45) Date of Patent: Aug. 3, 2010

(54) OPTICAL TRANSMISSION SYSTEMS, DEVICES, AND METHODS

(75) Inventor: David F. Smith, Ellicott City, MD (US)

(73) Assignee: Broadwing Corporation, Austin, TX (US)

( * ) Notice: Subject to any disclaimer, the term of this patent is extended or adjusted under 35 U.S.C. 154(b) by 1508 days.

(21) Appl. No.: 10/179,719

(22) Filed: Jun. 25, 2002

(65) Prior Publication Data

US 2002/0196490 A1  Dec. 26, 2002

Related U.S. Application Data

(60) Provisional application No. 60/300,746, filed on Jun. 25, 2001.

(51) Int. Cl.
*G02F 1/00* (2006.01)

(52) U.S. Cl. ............... 398/5; 398/3; 398/72; 398/83; 398/59; 398/100; 398/69; 398/60; 398/73; 370/389; 370/392; 370/352; 370/465; 725/105; 725/106; 725/127; 725/129; 725/125

(58) Field of Classification Search ............. 398/59, 398/58, 66, 67, 68, 70, 71, 72, 79, 3, 5, 1, 398/60, 69, 73, 83, 98, 99, 100; 370/389, 370/392, 352, 465, 432, 468; 725/121, 125, 725/127, 129, 105, 106
See application file for complete search history.

(56) References Cited

U.S. PATENT DOCUMENTS

| | | | |
|---|---|---|---|
| 5,351,146 A * | 9/1994 | Chan et al. | ............... 398/58 |
| 5,537,239 A | 7/1996 | Sotm | |
| 5,559,625 A * | 9/1996 | Smith et al. | ............... 398/66 |
| 5,801,858 A | 9/1998 | Roberts | |
| 5,867,289 A | 2/1999 | Gerstel | |
| 5,937,116 A | 8/1999 | Seto | |
| 6,011,623 A | 1/2000 | MacDonald | |
| 6,014,237 A | 1/2000 | Abeles | |
| 6,034,798 A * | 3/2000 | Oberg | ............... 398/2 |
| 6,067,179 A | 5/2000 | Roberts | |

(Continued)

FOREIGN PATENT DOCUMENTS

WO  WO-01/15368 A  3/2001

OTHER PUBLICATIONS

European Patent Office "Communication Pursuant to Article 94(3) EPC", for European Patent Application No. 02 747 973.2-2415, dated Jan. 30, 2009, 7 pages.

(Continued)

*Primary Examiner*—Hanh Phan
(74) *Attorney, Agent, or Firm*—Thorp Reed & Armstrong, LLP

(57) ABSTRACT

An optical system with a first and second network tiers. The first network tier includes a plurality of major nodes optically interconnected by at least one transmission path. The second network tier includes a plurality of minor nodes disposed along the transmission path and the minor nodes are connected to at least one of the major nodes. The minor node is configured to transmit all traffic to an adjacent major node, and the major nodes are configured to transmit to and receive information from other major nodes and minor nodes on transmission paths connected to the major node.

31 Claims, 22 Drawing Sheets

U.S. PATENT DOCUMENTS

| | | | |
|---|---|---|---|
| 6,101,016 A | 8/2000 | Roberts | |
| 6,137,604 A | 10/2000 | Bergano | |
| 6,147,786 A * | 11/2000 | Pan | 398/1 |
| 6,222,653 B1 | 4/2001 | Asahi | |
| 6,222,654 B1 * | 4/2001 | Frigo | 398/83 |
| 6,351,582 B1 * | 2/2002 | Dyke et al. | 385/24 |
| 6,426,815 B1 * | 7/2002 | Koehler | 398/59 |
| 6,567,429 B1 * | 5/2003 | DeMartino | 370/539 |
| H2075 H * | 8/2003 | Gnauck et al. | 398/58 |
| 6,658,013 B1 * | 12/2003 | de Boer et al. | 370/404 |
| 6,728,485 B2 * | 4/2004 | Pfeiffer | 398/74 |
| 6,885,821 B2 * | 4/2005 | Cooney et al. | 398/45 |
| 2001/0055321 A1 * | 12/2001 | Nagarajan et al. | 370/535 |
| 2002/0018260 A1 * | 2/2002 | Kisovec et al. | 359/124 |
| 2002/0105692 A1 * | 8/2002 | Lauder et al. | 359/124 |
| 2002/0141692 A1 * | 10/2002 | Hung | 385/24 |
| 2002/0176131 A1 * | 11/2002 | Walters et al. | 359/118 |

OTHER PUBLICATIONS

European Patent Office "Communication" of Supplementary Search Report, for European Patent Application No. 02 747 973.2-2415, dated Dec. 3, 2008, 3 pages.

Adel A M Saleh et al: "Architectural Principles of Optical Regional and Metropolitan Access Networks", Journal of Lightwave Technology, IEEE Service Center, 1999, New York, NY, US, vol. 17, No. 12, Dec. 1, 1999, XP011029627, ISSN: 0733-8724.

Brackett C A et al: "A Scalable Multiwavelength Multihop Optical Network: A Proposal For Research on All-Optical Networks", Journal of Lightwave Technology, 1993, IEEE Service Center, New York, NY, US, vol. 11, No. 5/06, May 1, 1993, pp. 736-752, XP000396705, ISSN: 0733-8724.

* cited by examiner

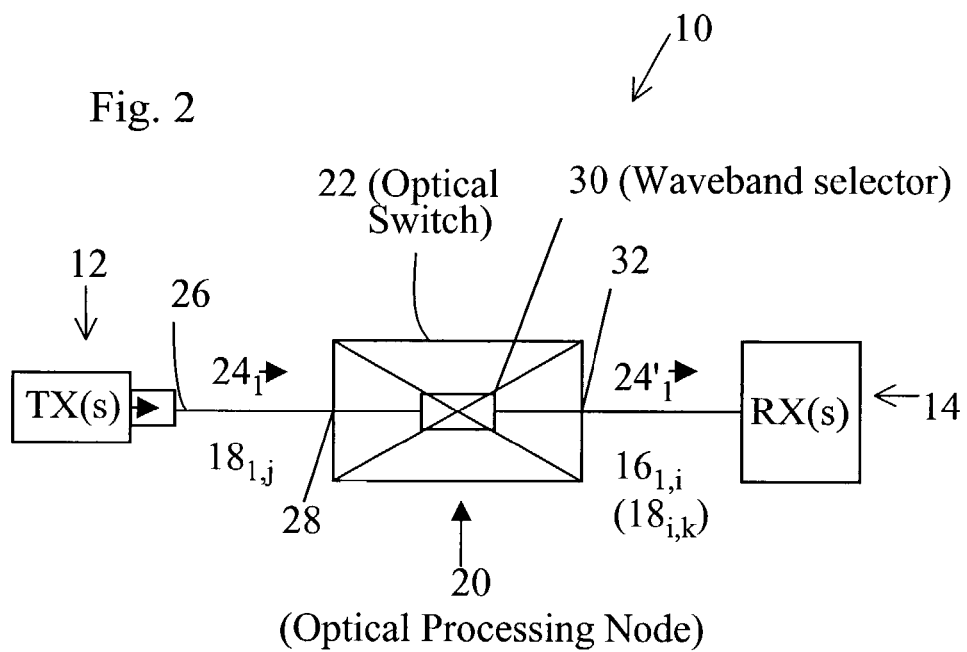
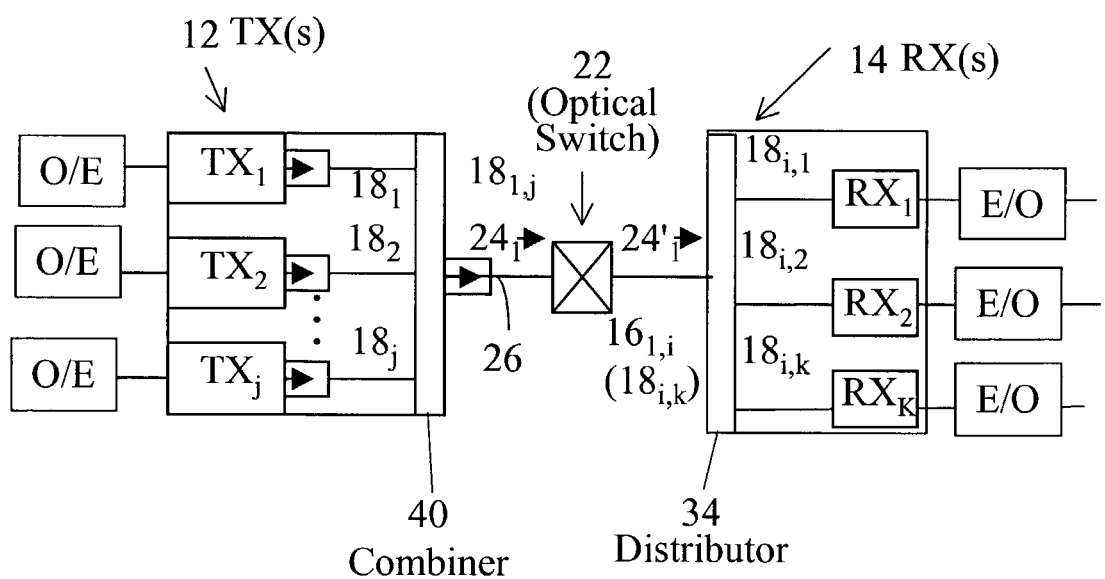

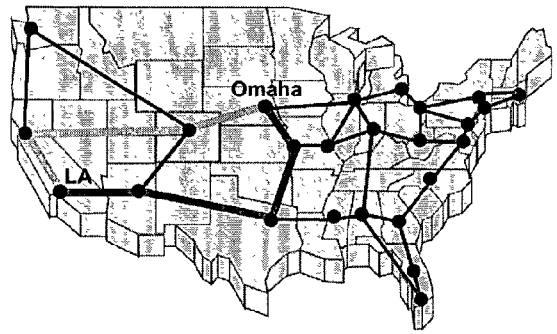
Fig. 16a　　　　　　　　Fig. 16b
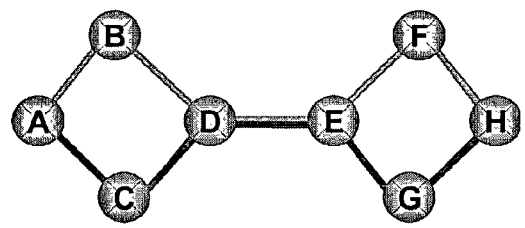
Fig. 17
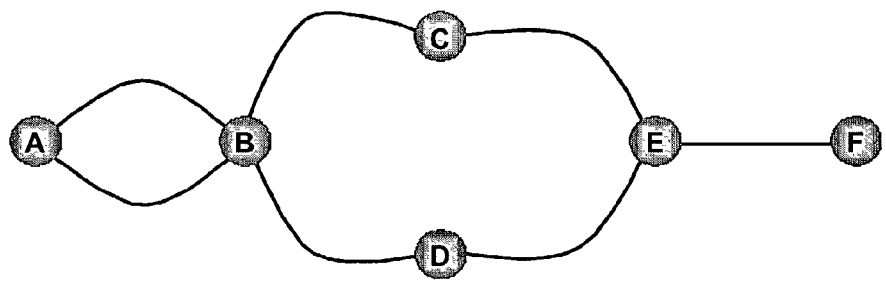
Fig. 18

OPTICAL TRANSMISSION SYSTEMS, DEVICES, AND METHODS

CROSS-REFERENCE TO RELATED APPLICATIONS

This application claims priority from U.S. Provisional Patent Application No. 60/300,746 filed on Jun. 25, 2001.

FEDERALLY SPONSORED RESEARCH AND DEVELOPMENT

Not Applicable.

BACKGROUND OF THE INVENTION

The present invention is directed generally to optical transmission systems. More particularly, the invention relates to wavelength allocation in multidimensional wavelength division multiplexed ("WDM") optical transmission systems.

Digital technology has provided electronic access to vast amounts of information. The increased access has driven demand for faster and higher capacity electronic information processing equipment (computers) and transmission networks and systems to link the processing equipment.

In response to this demand, communications service providers have turned to optical communication systems, which have the capability to provide substantially larger information transmission capacities than traditional electrical communication systems. Information can be transported through optical systems in audio, video, data, or other signal formats analogous to electrical systems. Likewise, optical systems can be used in telephone, cable television, LAN, WAN, and MAN systems, as well as other communication systems.

Early optical transmission systems, known as space division multiplex (SDM) systems, transmitted one information signal using a single wavelength in separate waveguides, i.e. fiber optic strand. The transmission capacity of optical systems was increased by time division multiplexing (TDM) multiple low bit rate, information signals into a higher bit rate signal that can be transported on a single optical wavelength. The low bit rate information carried by the TDM optical signal can then be separated from the higher bit rate signal following transmission through the optical system.

The continued growth in traditional communications systems and the emergence of the Internet as a means for accessing data has further accelerated the demand for higher capacity communications networks. Telecommunications service providers, in particular, have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, i.e., far-UV to far-infrared. The pluralities of information carrying wavelengths are combined into a multiple wavelength WDM optical signal that is transmitted in a single waveguide. In this manner, WDM systems can increase the transmission capacity of existing SDM/TDM systems by a factor equal to the number of wavelengths used in the WDM system.

Optical WDM systems are presently deployed as in point-to-point WDM serial optical links ("PTP-WDM") interconnected by electrical regenerators and switches. At each regenerator in the PTP-WDM systems, the information being transmitted can be merely regenerated on the same wavelength and retransmitted through the next link or electrically switched to one of a plurality of links, different fiber, and/or a different wavelength. Various electrical switch devices can be used to switch the information between the different links at each regeneration site.

As would be expected, the cost of performing optical-electrical-optical conversions in PTP-WDM systems becomes extremely expensive merely to route traffic through a network. The cost of electrical regeneration/switching in WDM systems will only continue to grow with WDM systems having increasing number of optical signal channels, or wavelengths. As such, there is a desire to eliminate unnecessary, and costly, electrical switching of information being transported in optical systems.

Numerous optical cross-connect switches have been proposed as alternatives to electrical switching. For example, U.S. Pat. Nos. 4,821,255, 5,446,809, 5,627,925 disclose various optical switch devices. A difficulty with optical cross-connect switches is that the switches become overly complex as the number of optical channels and input/output ports on the device is increased.

As the need for high capacity WDM systems continues to grow, it will become increasingly beneficial to provide all-optical networks that eliminate the need for electrical conversion to perform signal routing and grooming in the networks. The development of multi-dimensional all-optical networks will provide the cost and performance characteristics required to further development of high capacity, more versatile, longer distance communication systems.

BRIEF SUMMARY OF THE INVENTION

The systems, devices, and methods of the present invention address the above-stated needs. In one embodiment, the present invention is an optical system including a first network tier including a plurality of major nodes optically interconnected by at least one transmission path, and a second network tier including a plurality of minor nodes disposed along the transmission path and the minor nodes are connected to at least one of the major nodes, wherein the minor node is configured to transmit all traffic to an adjacent major node and the major nodes are configured to transmit to and receive information from other major nodes and minor nodes on transmission paths connected to the major node.

In another embodiment the present invention is an optical system including a plurality of major nodes optically interconnected by at least one transmission path, and at least one minor node disposed along the transmission path connected to at least one of the major nodes, wherein the minor node is configured to transmit all traffic to an adjacent major node and the major nodes are configured to transmit to and receive information from other major nodes and minor nodes on transmission paths connected to the major node.

In another embodiment, the present invention is a method for optically communicating in an optical network having first and second network tiers including a plurality of major and minor nodes, respectively, interconnected by at least one optical communications path, including receiving at a major node traffic from a minor node, aggregating traffic received at the major node from the minor node, and transmitting traffic from the major node to another node in the network.

Those and other embodiments of the present invention will be described in the following detailed description. The present invention addresses the needs described above in the description of the background of the invention by providing improved systems, apparatuses, and methods. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same, wherein:

FIGS. 2-5 depict optical communication systems of the present invention;

FIGS. 16-18 show routing methods according to the present invention;

DESCRIPTION OF THE INVENTION

Figure 1:
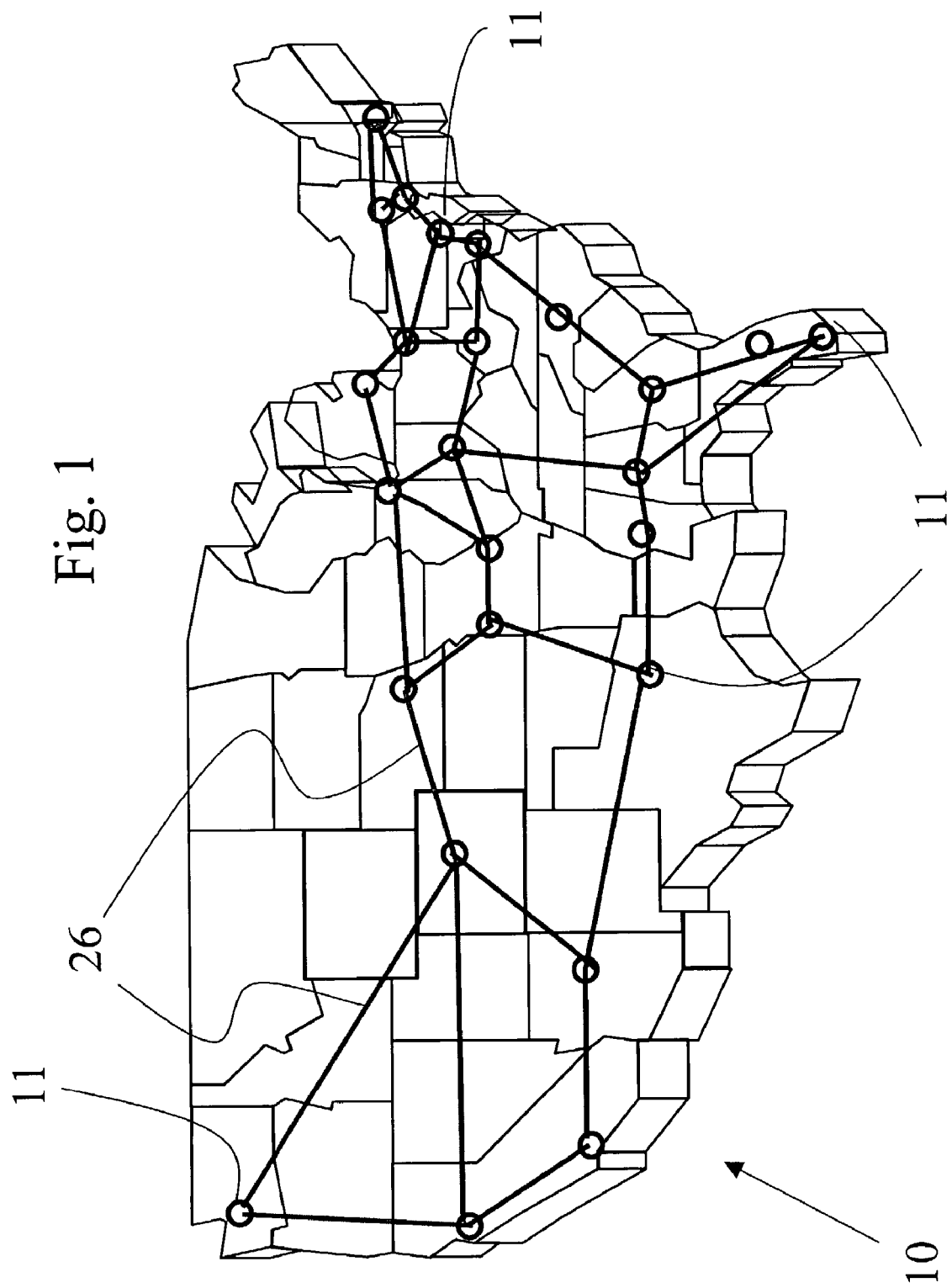
FIG. 1 shows a system or network of the present invention.

FIG. 1 illustrates an embodiment of an optical network or system 10 including a plurality of optical nodes 14 connected by optical communication paths 26. The system 10 can employ one or more transmission schemes, such as space division multiplexing, time division multiplexing, wavelength division multiplexing, etc. The system 10 will be described as being "all-optical", although advantages of the present invention can be realized with other than all-optical systems.

All-optical systems are those in which optical communication paths 26 are uninterrupted throughout the system 10 so that signals can travel between nodes 11 and through nodes 11 without undergoing an optical-electrical-optical conversion. When signals in all-optical systems are to be regenerated, they are removed from the optical communication paths 26 of the system 10 without terminating the optical communication path 26, so that other signals that do not need to be regenerated can continue without having to undergoing an optical-electrical-optical conversion. Optical signals to be regenerated are removed from the optical communication path 26, converted to electrical form, regenerated, converted back into optical form, and the regenerated optical signal is inserted on the optical communication path 26 of the system 10.

The optical nodes 11 can include various optical signal processing devices, such as transmitters and receivers (which can be collocated to form an optical network gateway ("ONG")), optical cross-connect switches or routers ("OXC"), amplifiers, and optical add/drop multiplexers ("OADMs"). ONGs are used to terminate an optical communication path 26, as well as interface between two systems 10, convert signals from the optical domain to the electrical domain, and convert signals from the electrical domain to the optical domain, whereas OXCs and OADMs allow signals to be selectively added and/or dropped from a communication path 26 without terminating the path 26. The system 10 can also include signal processing devices in locations other than the nodes 11, such as amplifiers located between the nodes 11.

The optical nodes 11 are generally configured to switch, route, demultiplex, multiplex, convert, and/or terminate pluralities of optical signal channels as groups, referred to as wavebands or "spectral groups". Examples of signal processing devices which process signal channels as spectral groups are described in more detail hereinbelow with respect to FIGS. 2-14, and such devices will be referred to as spectral group routers ("SGRs"). Each SGR will typically have the capacity for a plurality of spectral groups. For example, an SGR 11 may be designed to process up to one hundred or more signal channels using five, ten, twenty-five, fifty or more spectral groups, each including one or more signal channels within each spectral group.

A spectral group is one or more signal channels that share a common path or portion of the system 10, although all signal channels in a spectral group do not necessarily have to share the identical path. As a result of commonality within a spectral group, efficiencies can be realized with a system 10 in which SGRs 11 process signal channels as spectral groups (e.g., all signal channels in a spectral group are switched to the same output path, or all signal channels in a spectral group are added or dropped from the system 10), rather than as individual channels. As a result, the SGR 11 processing signal channels from an optical communication path 26 has only as many processing operations to perform as there are spectral groups, regardless of the number of signal channels being carried by that path 26.

The optical communication paths 26 can include various guided and unguided media to provide for communication between the network nodes 11 in the system 10. The optical communication paths 26 generally include one or more optical fibers forming the paths between network nodes 11. Each path 26 can carry one or more uni- or bi-directionally propagating optical signal channels, or wavelengths. An optical link is the communication path 26 between two nodes 11.

In all-optical systems 10, signal channels or wavelengths must be allocated to each node 11, such that the signal channels used by some nodes 11 do not conflict with signal channels used by other nodes 11. When SGRs are used, the spectral groups and the signal channels contained therein, must be allocated in a manner such that they do not contend with other spectral groups and other signal channels. A particular spectral group may extend through an entire system 10, or it may extend through only a portion of a system 10. Because the number of spectral groups that can be handled by the nodes 11 is limited, it is often advantageous to organize the system 10 so as to maximize the number of channels in each spectral group. To that end, the system 10 can be organized into several sub-networks to allow convenient grouping of channels into spectral groups.

The sub-network for one spectral group may be different than a sub-network for another spectral group passing through the same portion of the system 10. However, the edges of one spectral group must interface with another spectral group, or the signals carried on that spectral group will not continue to propagate through the system 10. At the interface of these spectral groups, the signal channels which continue to propagate will enter a new spectral group. Such transitioning of channels between spectral groups is accomplished by the SGRs. Information can be carried on one signal channel in one spectral group and then carried by another signal channel in the next spectral group, although such transitions are not required. Changing the channel on which the information is carried can be effected by dropping the signal channel at a node 11, performing an optical to electrical conversion, and then performing an electrical to optical conversion onto a different optical signal channel. Alternatively, signal channels can be changed optically by performing an optical wavelength conversion. Other processing, such as filtering, reshaping, and retiming of the signal may also be performed.

A spectral group can be defined in terms of the sub-network in which it exists. A spectral group is terminated at one or more nodes 11 defining the edge of, and bounding, the sub-network. Because the spectral groups are terminated at the edges of the sub-network, spectral groups can be reused in other sub-networks in the system 10.

Spectral groups allow the size, cost, and complexity of network elements 11 (e.g., SGRs) to be reduced. Of course, a system 10 utilizing such network elements will typically contain many spectral groups, and the manner in which those spectral groups are formed and ordered is important to the efficient and proper operation of the system 10. Those and other features must be considered when forming systems 10 and SGRs using spectral groups. Methods of forming such systems 10 and SGRs are described hereinbelow with respect to FIGS. 15-29.

FIG. 2 shows a more detailed portion of the system 10. Generally, the optical system 10 has nodes 11 in the form of at least one optical transmitter 12 and at least one optical receiver 14, as shown in FIG. 2. Each transmitter 12 is configured to transmit information via one or more information carrying wavelengths $18_{l,k}$ contained in at least one waveband $16_{l,i}$ to the receivers 14. Each receiver 14 is configured to receive the information carried via one or more of the information carrying wavelengths $18_{l,k}$. As used herein, the term "information" should be broadly construed to include any type of data, instructions, or signals that can be optically transmitted.

As shown in FIG. 2, the system 10 further includes at least one intermediate optical processing node 20, such as an optical switch 22. The transmitter 12 is configured to transmit an optical signal 24 containing one or more information carrying wavelengths $18_j$ along signal transmission waveguide, i.e., fiber, 26 to the switch 22 via input port 28. The optical processing node 20 includes one or more waveband selectors, or selective element, 30 that are configured to pass and/or substantially prevent the passage of information in wavebands $16_i$ to the receiver 14 via output ports 32. Because the information is being manipulated in wavebands, the individual information carrying wavelengths $18_j$ within the waveband $16_i$ do not have to be separated in individual wavelengths to be managed and processed. Also, the individual wavelengths $18_j$ within the waveband $16_i$ be varied in the system 10 without affecting the configuration of the optical processing node 20. Wavelengths $18_j$ in the original signal 24 but not within the waveband $16_i$ are prevented from passing through to the receivers 14.

In the present invention, optical signals 24 can be produced including a number of wavebands 16, each of which may contain one or more information carrying wavelengths in a continuous band of wavelengths or a plurality of wavelength bands. For example, a waveband 16 can be defined as having a continuous range of ~200 GHz containing 20 different information carrying wavelengths $18_{1-20}$ spaced apart on a 10 GHz grid. The bandwidth of each waveband can be uniformly or variably sized depending upon the network capacity requirements. Likewise, the bandwidth of the waveband is not restricted, but can be varied to accommodate varying numbers of wavelengths.

Generally, systems 10 of the present invention are configured so that the optical processing nodes do not separate and process individual information carrying wavelengths during transmission from the transmitter to the receiver. Instead, optical processing nodes 20 are configured to process the information in wavebands that may include any number of individual information carrying wavelengths. The processing of information in wavebands decreases the complexity involved in processing large numbers of channels, while increasing the flexibility of optical components deployed in the transmission path between transmitters and receivers. The bandwidth and number of information carrying wavelengths within a waveband in a network can be statically or dynamically allocated depending upon the information traffic flow in a given network segment.

Figure 3:
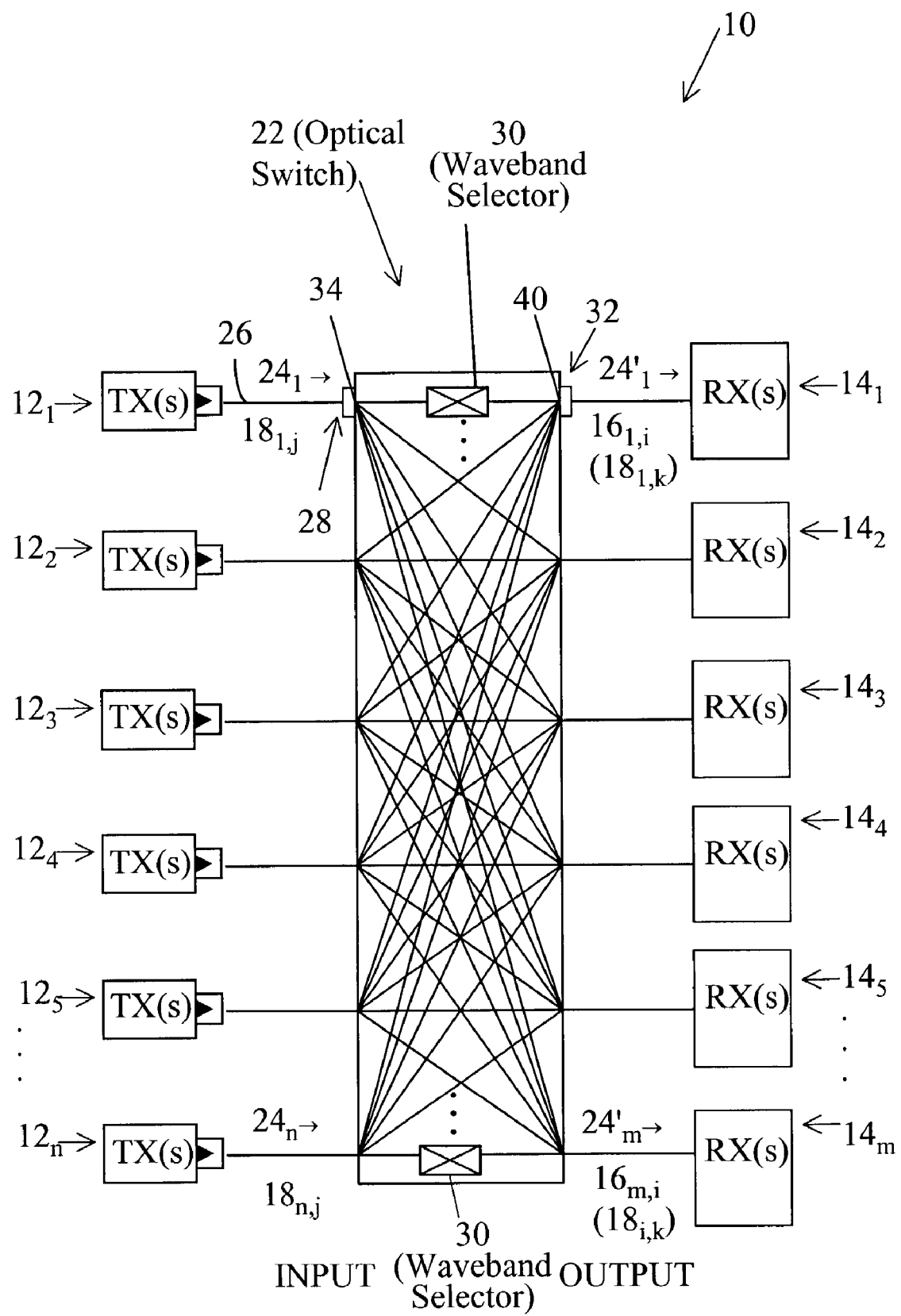

FIG. 3 shows a more general arrangement of the system 10, which includes a plurality of transmitter $12_n$ optically connected via the switch 22 to a plurality of receiver $14_m$. Analogous to FIG. 2, each transmitter $12_n$ transmits an optical signal $24_n$ which includes one or more wavelengths $18_{nj}$ through a waveguide $26_n$ to an input port $28_n$ of the switch 22. It will be appreciated that each transmitter may include one or more sources to transmit and one or more wavelength signals. Likewise, each receiver may include one or more detectors for receiving the signals.

An optical distributor $34_n$, such as a demultiplexer 36 and/or a splitter 38, is provided in the input port $28_n$ to distribute the signal $24_n$ to the waveband selectors $30_{n,m}$. An optical combiner $40_m$, such as a wavelength division multiplexer 42 or a coupler 44, is generally included to combine the wavelengths $18_{m,k}$ in waveband $16_{m,l}$ emerging from the waveband selectors $30_{n,m}$ and provide a modified signal $24'_m$. The modified signal $24'_m$ exits the switch through the output port $32_m$ and passes along waveguide 26 to the receiver $14_m$.

For convenience and clarity, FIG. 3 shows only a waveband selector 30 connecting input port $28_l$ to output port $32_l$. However, it should be understood that the switch 22 will generally include at least one waveband selector 30 between each input port 28 and each output port 32. It is also noted that in some networks it is not necessary that corresponding input and output ports, e.g. $28_l$ and $32_l$, be connected to loop a signal back to its point of transmission. In addition, reference numeral subscripts are generally not used in the remainder of the description to simplify the nomenclature.

Transmitters 12 used in the system 10 can include one or more optical emitters and sources that provide continuous wave and/or pulsed beams, such as one or more modulated lasers as is known in the art. The transmitter 12 may also include narrow band incoherent sources such as described in U.S. Pat. Nos. 5,191,586 and 5,268,910 issued to Huber or other optical sources for producing optical signals. Information can be directly or indirectly, e.g., externally, modulated, or alternatively upconverted, onto an optical wavelength, and the information itself may be a time division multiplexed signal.

The transmitter 12 can also be used to provide multiple information carrying wavelengths using techniques such as described in U.S. Pat. No. 5,400,166. Multiple information carrying wavelengths can be placed on a single carrier from the transmitter 12 using techniques, such as subcarrier modulation (SCM). SCM techniques are described in U.S. Pat. Nos. 5,101,450, 5,134,509, and 5,301,058 issued to Olshansky, U.S. Pat. No. 4,989,200 issued to Olshansky et al., U.S. Pat. No. 5,432,632 issued to Watanabe and U.S. Pat. No. 5,596,436 issued to Sargis et al.

The transmitters 12 may be coupled to an external electrical network or part of an optical-electrical-optical (O/E/O)

signal regenerator within an optical network. One skilled in the art will appreciate that the selection of the transmitter 12 and the number of information carrying wavelengths will depend upon the desired information transfer rates for a particular transmitter/receiver system at the respective nodes. While the present invention provides the ability to substantially upgrade the transfer rate for the node, it does not require that older, slower nodes be upgraded upon implementation of the present invention.

Consistent with the discussion regarding the transmitter 12, the receiver 14 and transmission fiber 26 does not have to be upgraded to be compatible with the present invention. In the present invention, the capabilities of the receiving system can be taken in account when establishing wavebands to be transmitted to a particular receiver 14.

As shown in FIG. 4, the receiver 14 will generally be used to separate the individual information carrying wavelengths $18_{i,k}$ in each waveband $16_i$ contained in the modified signal 24' and convert the information to one or more electrical signals. The receiver may include a number of a wavelength filters, such as Bragg gratings or demultiplexers, in combination with an optical to electrical converter (O/E), such as a photodiode, to provide for direct detection of the individual wavelengths. The receiver 14 may also provide for indirect detection of the individual wavelengths, such as by using coherent detector arrangements.

Figure 5:
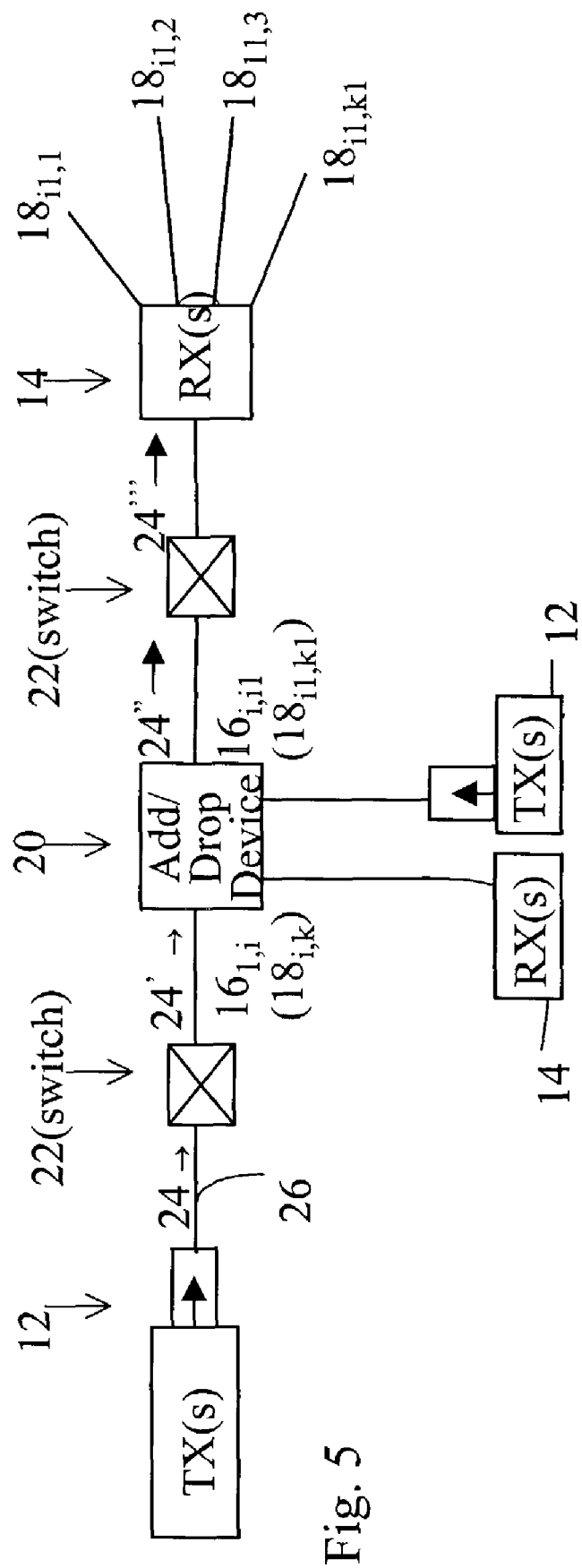

Referring to FIG. 5, the system 10 may include other types of intermediate processing nodes 20, such as add and/or drop devices. The other intermediate processing nodes can be employed to selectively modify the wavebands in the signal 24' and pass a further modified signal 24" to successive switches 22 and to the receivers 14. The subsequent switches 22 between other intermediate processing nodes 20 and the receivers 14 can be used to further process the signal 24" to produce a further modified signal 24''' which may include waveband subset $16_{i,l}$. The optical add and/or drop devices/ports can be embodied as a 2×2 switch that can provide for 100% programmable add/drop capability or by employing directional devices, such as couplers and/or circulators, with or without waveband selectors 30 to provide varying degrees of programmability, as will be further discussed.

The receiver 14 can also be used to further distribute the signal 24''' as a part of an O/E/O signal regenerator. One skilled in the art will appreciate that in an O/E/O regenerator the optical wavelengths received by the receiver 14 do not necessarily have to correspond to the optical wavelengths at which the information is further transmitted.

Waveband selectors 30 generally include at least one filter, gate, and/or switch configured to pass and/or substantially prevent the passage of at least one waveband 16 received from the inlet port 28 to the outlet port 32. A signal is generally considered to be substantially prevented from passage, if the signal is sufficiently attenuated such that a remnant of the attenuated signal that passes through the waveband selector does not destroy signals that have been selectively passed through the optical processing node 20. For example, a 40 dB attenuation of a signal will generally be sufficient to prevent cross-talk interference between remnant signals and signals being selectively passed through the optical processing node 20.

Figure 6:
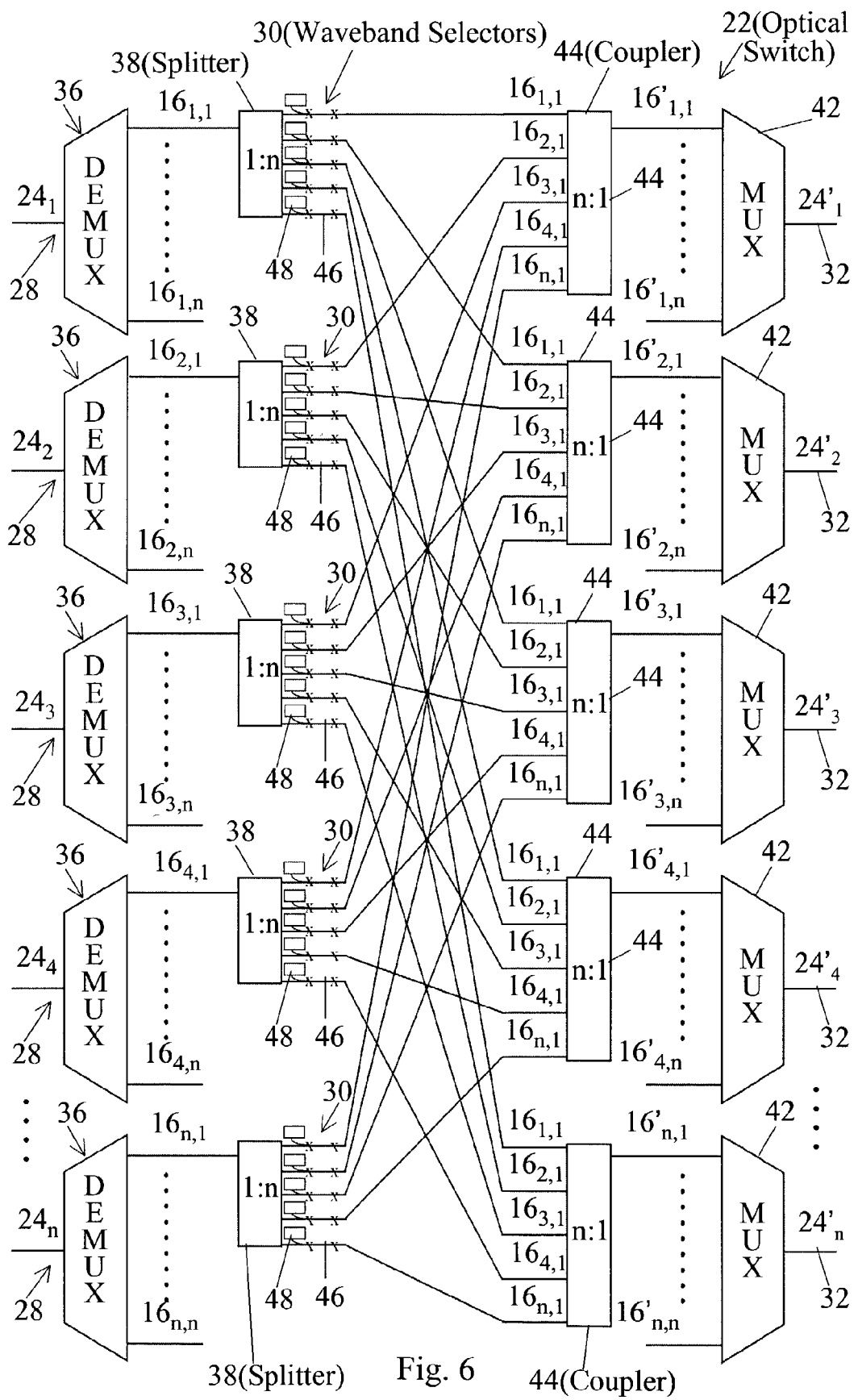
FIGS. 6-9*b* depicts waveband selectors of the present invention.

In an embodiment shown in FIG. 6, the switch 22 includes a waveband demultiplexer 36 and an optical signal splitter 38 coupled via a doped optical fiber 46 to the multiplexer 42 at the output port 32. When an optical signal is to be passed to the output port 32, the doped fiber is supplied with energy from the switch pump 48 to overcome the absorption of the doped fiber 46. The amount of energy supplied by the pump 48 can be controlled to selectively amplify or attenuate a signal being passed through the waveband selector 30. In the absence of optical pump energy, the doped fiber 46 will absorb the optical signal, thereby substantially preventing the passage of that portion of the signal to the outlet port 32. In the embodiment of FIG. 6, the wavebands can be switched to any number of output ports including one to one switching and one to many broadcasting.

The dopant in the doped optical fiber 46 can be erbium or any other dopant including other rare earth elements that can render the fiber transmissive in one state and substantially less transmissive in another state. The selection of a dopant in the doped fiber will depend upon the information carrying wavelengths that are to be switched in the system. Also, mechanical, electro-optic, liquid crystal, semiconductor, and other types of switches along with gratings, filters and gates, can be substituted for or used in combination with doped fiber 46 to achieve desired characteristics in the switch 22.

The waveband selector 30 may include reflective (≧50% reflectance) and/or transmissive (≦50% reflectance) selective elements that can be used to pass, either reflect or transmit, any of the wavebands 16 that comprise the signal 24. The waveband selector 30 may employ Mach-Zehnder filters, Fabry-Perot filters, and Bragg gratings to perform the waveband selection.

Figure 7A:
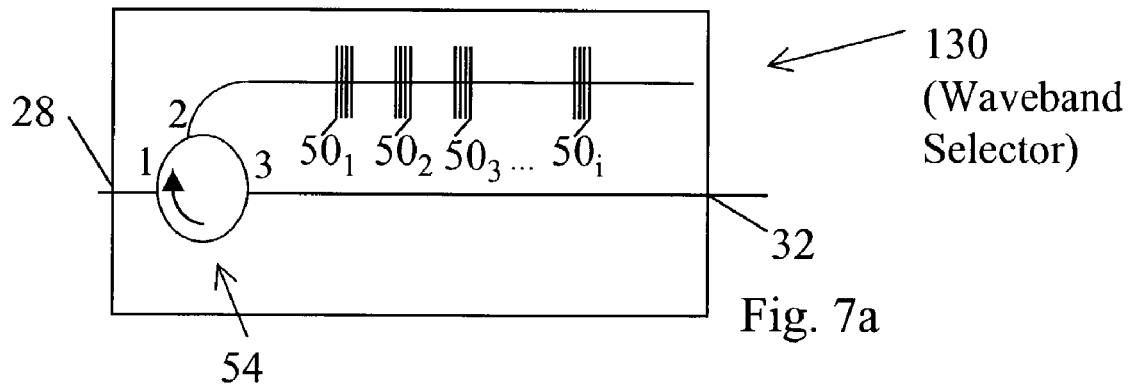
Figure 7B:
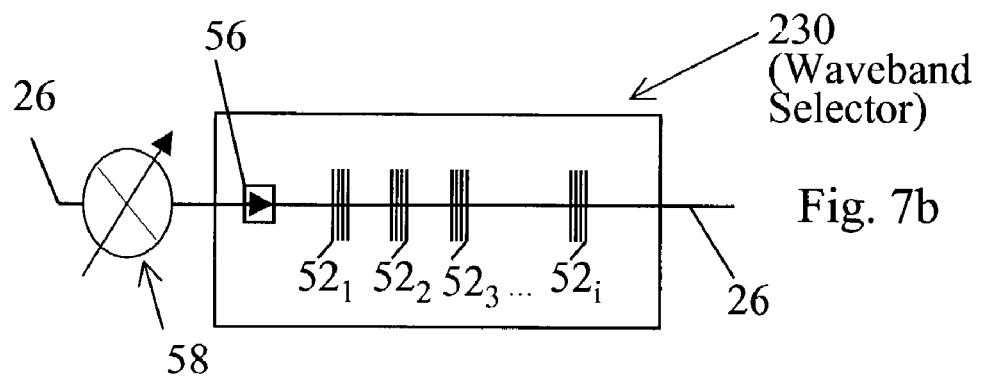
Figure 8:
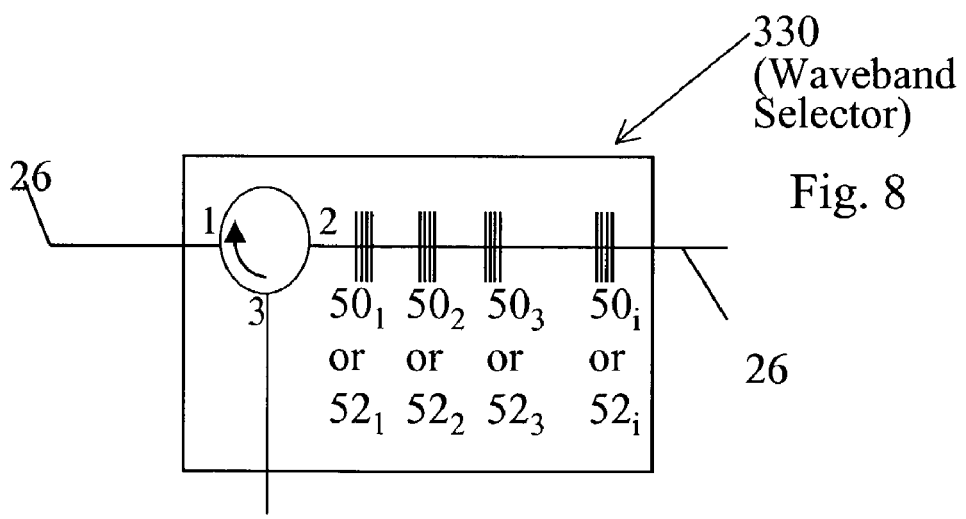

As shown in FIGS. 7 and 8, waveband selectors 130 and 230, respectively, can include a plurality of in-fiber reflective Bragg gratings 50 (FIG. 6) and/or transmissive Bragg gratings 52 (FIG. 7) to pass selected wavebands to the output ports 32. Each grating, 50 and 52, can be provided to pass selected wavebands to output ports 32. Alternatively, the waveband selector 30 may include a series of multiple Bragg gratings that provide for piecewise coverage of the waveband. In the case of a multiple grating waveband selector, some separation of the wavelengths in the waveband will occur between gratings, but the multiple gratings are collectively operated to pass or substantially prevent the passage of the waveband. The multiple grating selector can be tuned to individual idler gaps or telescoped to one or more common idler gaps to decrease the idler gap bandwidth.

The number of gratings in FIGS. 7 and 8 is shown as being equal to the number of wavebands 16 being switched. However, the number of selectors provided in the switch does not necessarily have to correspond to number of wavebands 16 currently in the system. For example, the configurations shown in FIGS. 6-12 may also be suitable for use in add/drop multiplexers, as well as demultiplexers or multiplexers, in which any number of wavebands can be processed.

It may also be advantageous to provide sub-wavebands within the wavebands 16 of varying size that can be received, divided into the sub-wavebands, and the sub-wavebands can further transmitted to other receivers within the system. The waveband selectors 30 can also be used to pass multiple wavebands to reduce the number of components in the system 10. In addition, the wavebands 16 can be selected to overlap to allow one or more wavelengths 18 to be transmitted in multiple wavebands 16.

As shown in FIG. 7a, a waveband selector 130 can include a three port circulator 54 used in conjunction with the plurality of reflective Bragg gratings 50 using a configuration similar those discussed in U.S. Pat. Nos. 5,283,686 and 5,579,143 issued to Huber, and U.S. Pat. No. 5,608,825 issued to Ip. In FIG. 7b, a waveband selector 230 employs transmissive gratings 52 to transmit selected wavebands to the output ports 32 and reflect the remaining wavebands. An optical isolator 56 can be incorporated to prevent reflected wavebands from propagating back to the input ports 28. One skilled in the art will appreciate that directional couplers and other directional devices can be substituted for the optical circulators with appropriate circuit modifications.

The optical processing node 20 may include a wavelength converter 58 to provide for switching one of more of the wavelengths in the transmitted signal 24. In FIG. 7a, the wavelength converter 58 is shown before the waveband selector 30; however, the wavelength converter 58 may also be positioned after the waveband selector 30 and operated accordingly.

Similarly in FIG. 8, a waveband selector 330 can be used with one or more directional devices, such as a circulator or a coupler, with either reflective or transmissive waveband gratings, $50_i$ or $52_i$, to select wavebands. It will be appreciated that the selector 330 can be employed as an add and/or drop device/port, as well as a filter or in a demultiplexer or multiplexer in the system 10.

Figure 9A:
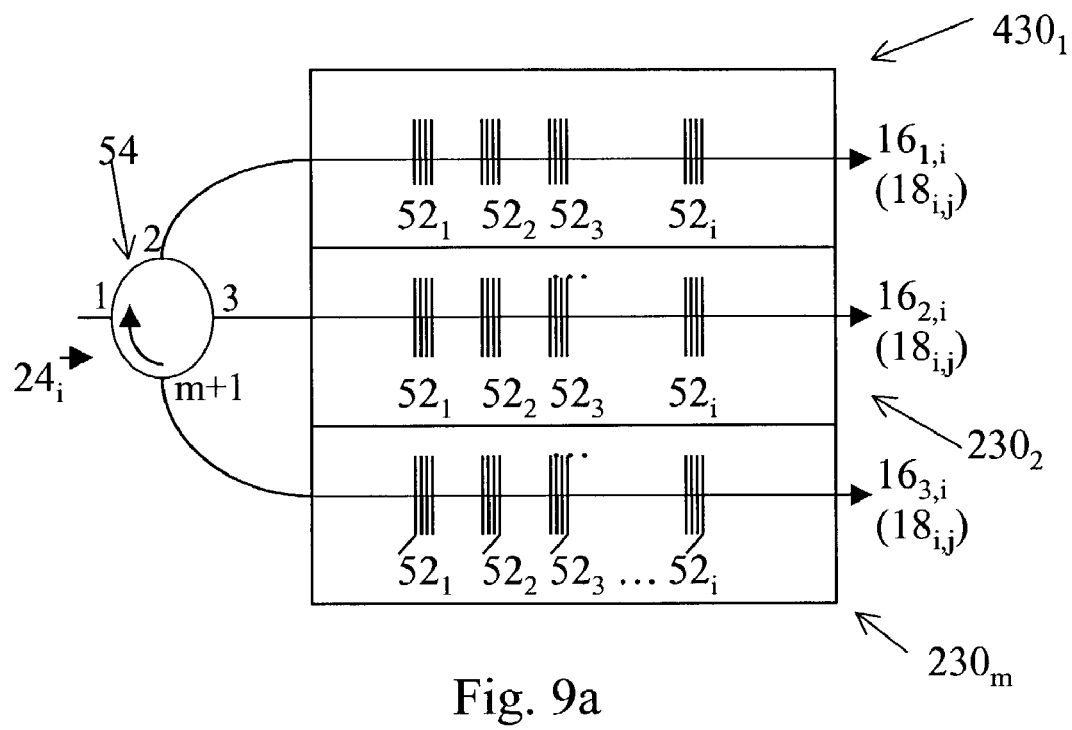

The optical distributor 34 associated with the input port 28 can be embodied as an optical splitter to split the signal 24 and distribute a portion of the entire signal 24 to each of the output ports 32. As shown in FIG. 9a, the optical distributor 34 can be embodied as a circulator 54 to provide the entire signal to each waveband selector 430. Wavelengths within waveband of the selector 230 are transmitted to the output port 32, while the remaining wavelengths are reflected by the transmissive gratings and circulated to successive ports.

Figure 9B:
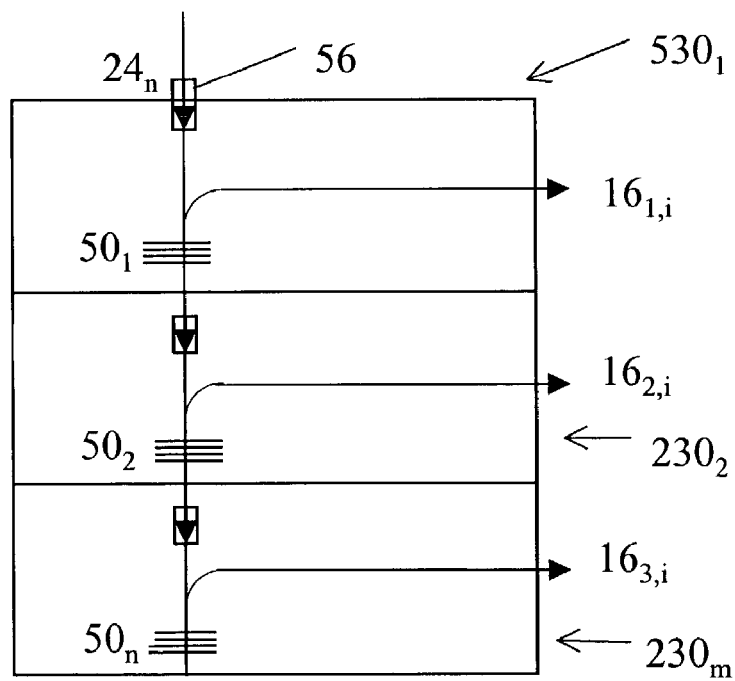

Likewise, optical couplers can serve as the distributor 34 to provide the entire signal to waveband selector 530 (FIG. 9b). One skilled in the art will appreciate that directional devices, such as multiple three port circulators and/or coupler, can be cascaded in various other configurations equivalent to those shown in FIGS. 9a&b. The gratings, 50 or 52, could be prepared having a reflectivity and transmittance of less than 100%, to allow a portion of signal to be transmitted and reflected.

The fiber Bragg gratings 50 and 52 used in the switch 22 can be permanently and/or transiently produced. Embodiments of the present invention incorporate fixed and/or tunable permanent Bragg gratings, 50 and 52 as the waveband selectors 30. The permanent gratings used in the present invention can be prepared by conventional methods, such as by using ultraviolet (UV) light to irradiate a $GeO_2$ doped fiber core. Such methods are discussed in U.S. Pat. No. 4,725,110 issued to Glenn et al., U.S. Pat. Nos. 5,218,655 and 5,636,304 issued to Mizrahi et al., which are incorporated herein by reference, and related patents.

The permanent gratings can be tuned to provide for reflectance of a waveband in one mode and transmittance in another mode. Tuning of the grating properties can be accomplished mechanically (stretching), thermally, or optically, such as discussed in U.S. Pat. Nos. 5,007,705, 5,159,601, and 5,579,143, and by M. Janos et al., Electronics Letters, v32, n3, pp. 245-6, electronically, or in some other appropriate manner.

A limitation of tunable permanent gratings is that a portion of the wavelength band can not be used to transfer signals. The unused portion of the wavelength band, called an "idler" gap, is necessary to provide each permanent grating with a gap in the wavelength spectrum in which the grating will not affect a signal encountering the grating.

Transient reflective or transmissive gratings, $50^T$ and $52^T$, respectively, could also be used in the waveband selector 30. Transient gratings can be used to reduce or eliminate the need for idler gaps in the transmission wavelengths and provide increased flexibility in the wavelength selectivity of the switch 22.

Transient gratings, either $50^T$ or $52^T$, can be formed in a portion of the fiber in which the refractive index of the fiber can be transiently varied to produce a grating. In an embodiment, the fiber portion is doped with Erbium, other rare earth elements, such as Yb and Pr, and/or other dopants that can be used to vary the refractive index of the fiber to produce a grating. In another embodiment, the transient grating can be formed in a fiber section that contains a permanent grating to provide a combined performance grating and/or to establish a default grating in the absence of the transient grating.

Figure 10:
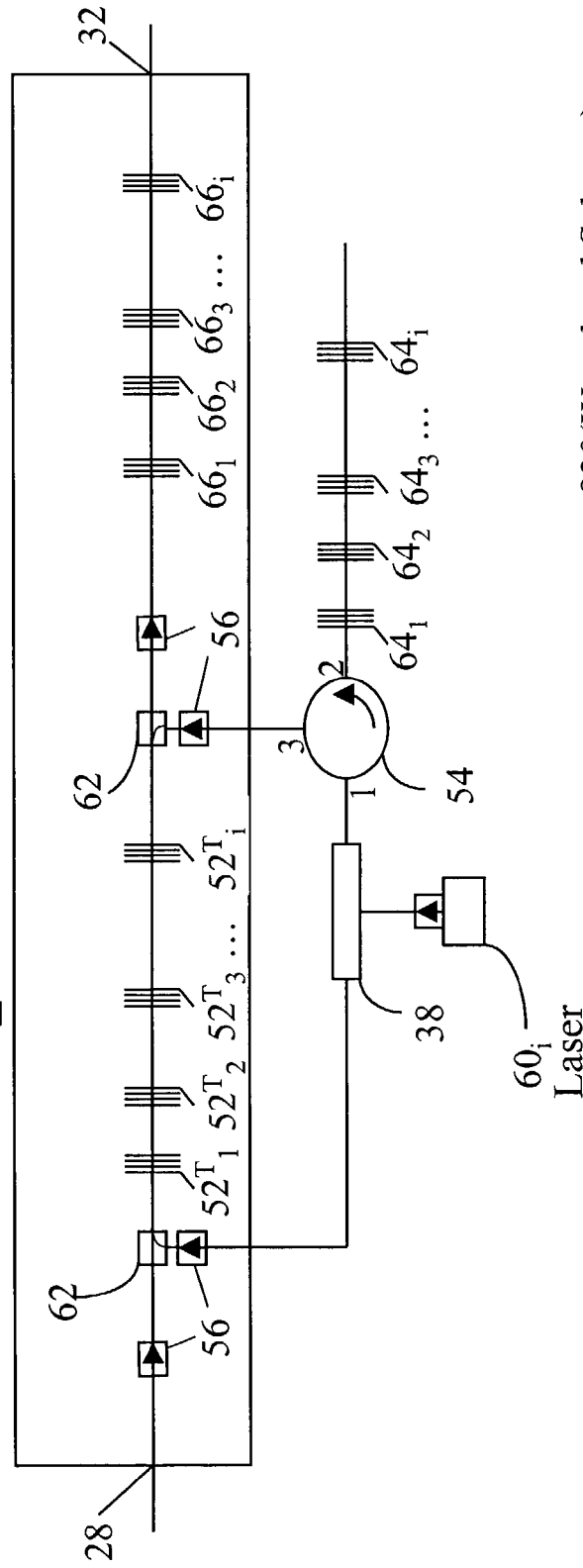
FIGS. 10-12 depict transient grating waveband selectors of the present invention.
Figure 12:
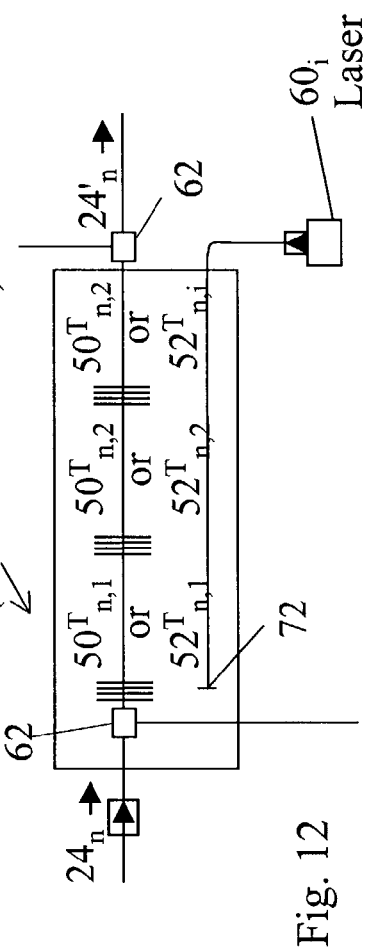
Figure 11:
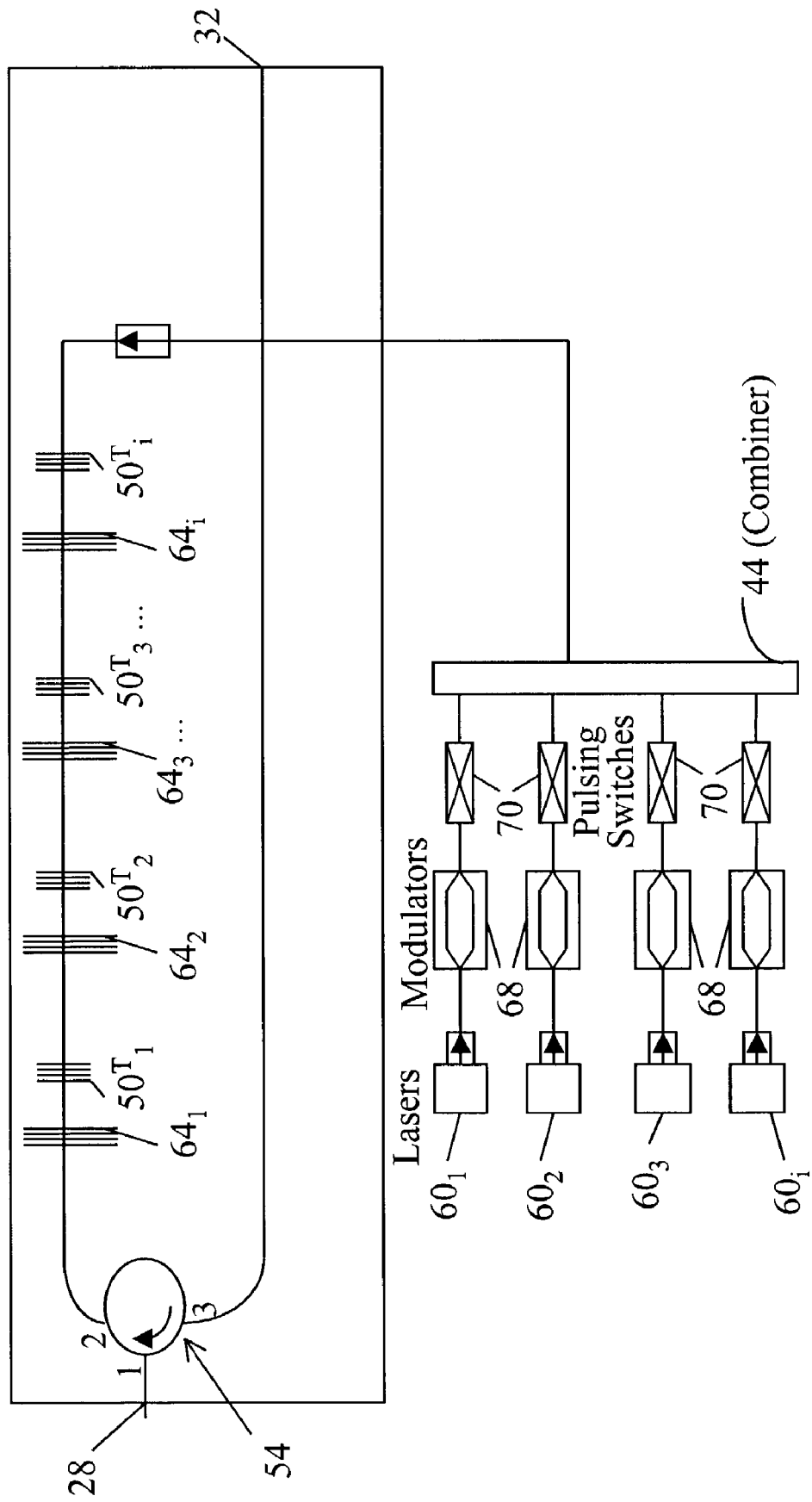

As shown in FIGS. 10-12, transient gratings can be written by introducing a grating writing beam either directly into the transmission fiber or by coupling the writing beam into the transmission fiber. One or more transient grating writing lasers $60_i$ are used to introduce a transient grating writing beam into the doped portion of the signal waveguide 26. In a waveband selector 630 shown in FIG. 10, the writing beam is split into two paths and introduced into the transmission fiber 26 via ports 62. A plurality of narrow wavelength reflective gratings $64_i$ are positioned in one of the writing beam paths to control the position of the standing wave in the waveguide 26 by introducing a time delay on the wavelengths of the writing beam. Narrow wavelength reflective or transmissive gratings, $64_i$ or $66_i$, can also be used to remove the writing beam from the transmission fiber 26.

As shown in FIG. 11, the writing beam can also be reflected back upon itself using spaced narrow wavelength reflective gratings $64_1$, to form a standing wave and produce a transient gratings $50^T$ in waveband selector 730. The grating writing lasers $60_1$ can be operated in conjunction with modulators 68 and pulsing switches 70 to control the coherence of the writing lasers $60_i$ and the resulting transient gratings $50^T_i$. A waveband selector 830, shown in FIG. 12, can also be configured with a reflector 72 in a coupled fiber to establish a standing wave by reflecting the writing beam back upon itself to form the standing wave in a manner similar to that described with respect to FIG. 11.

Single wavelength continuous writing beam arrangements have been used for signal identification and pattern recognition as discussed by Wey et al., "Fiber Devices for Signal Processing", 1997 Conference on Lasers and Electro-Optics, Baltimore, Md. Also, U.S. Pat. No. 5,218,651 issued to Faco et al., which is incorporated herein by reference, describes two beam methods for producing a transient Bragg grating in a fiber.

Figure 13:
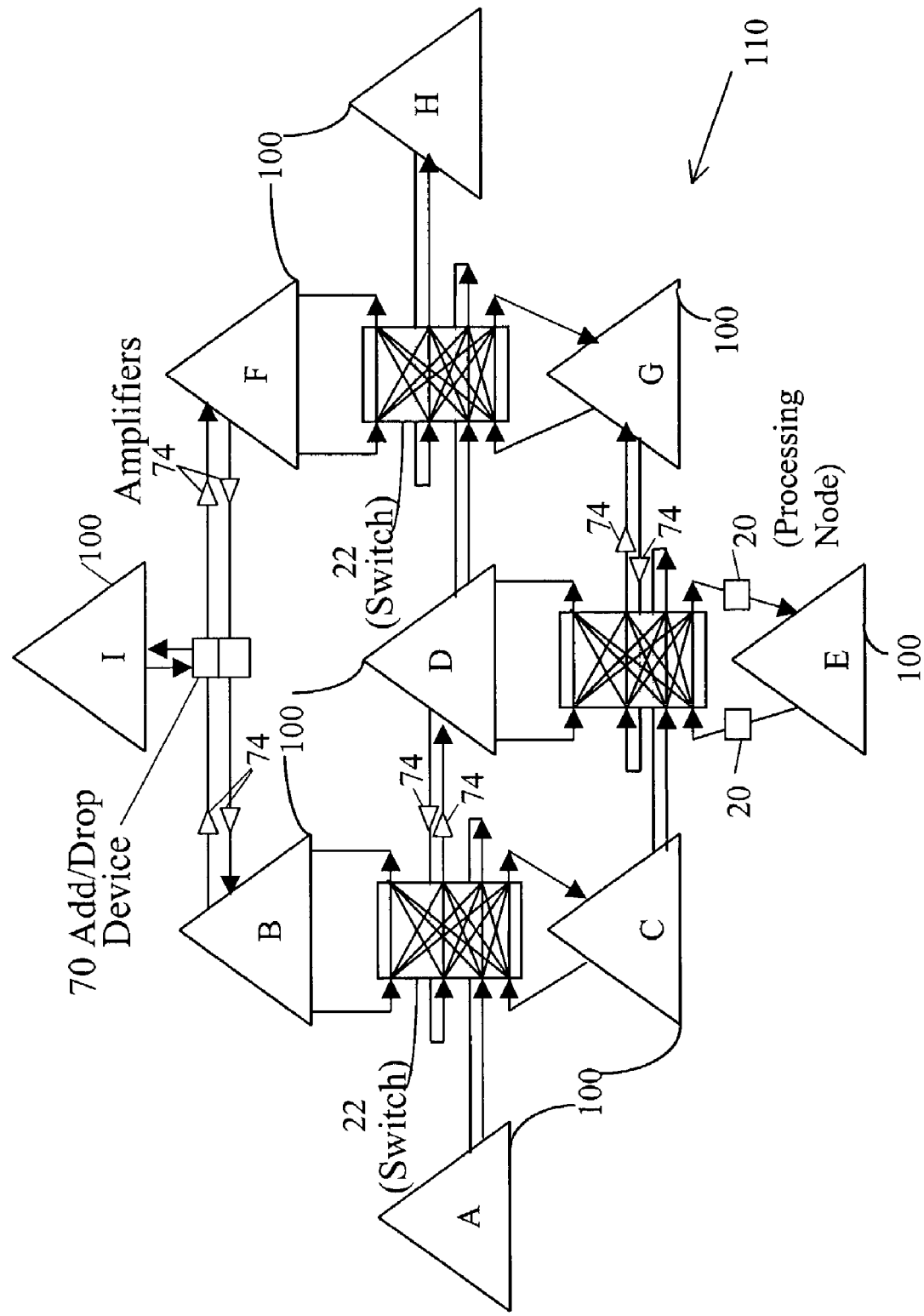
FIGS. 13-14 depict multi-node optical communication networks of the present invention.
Figure 14:
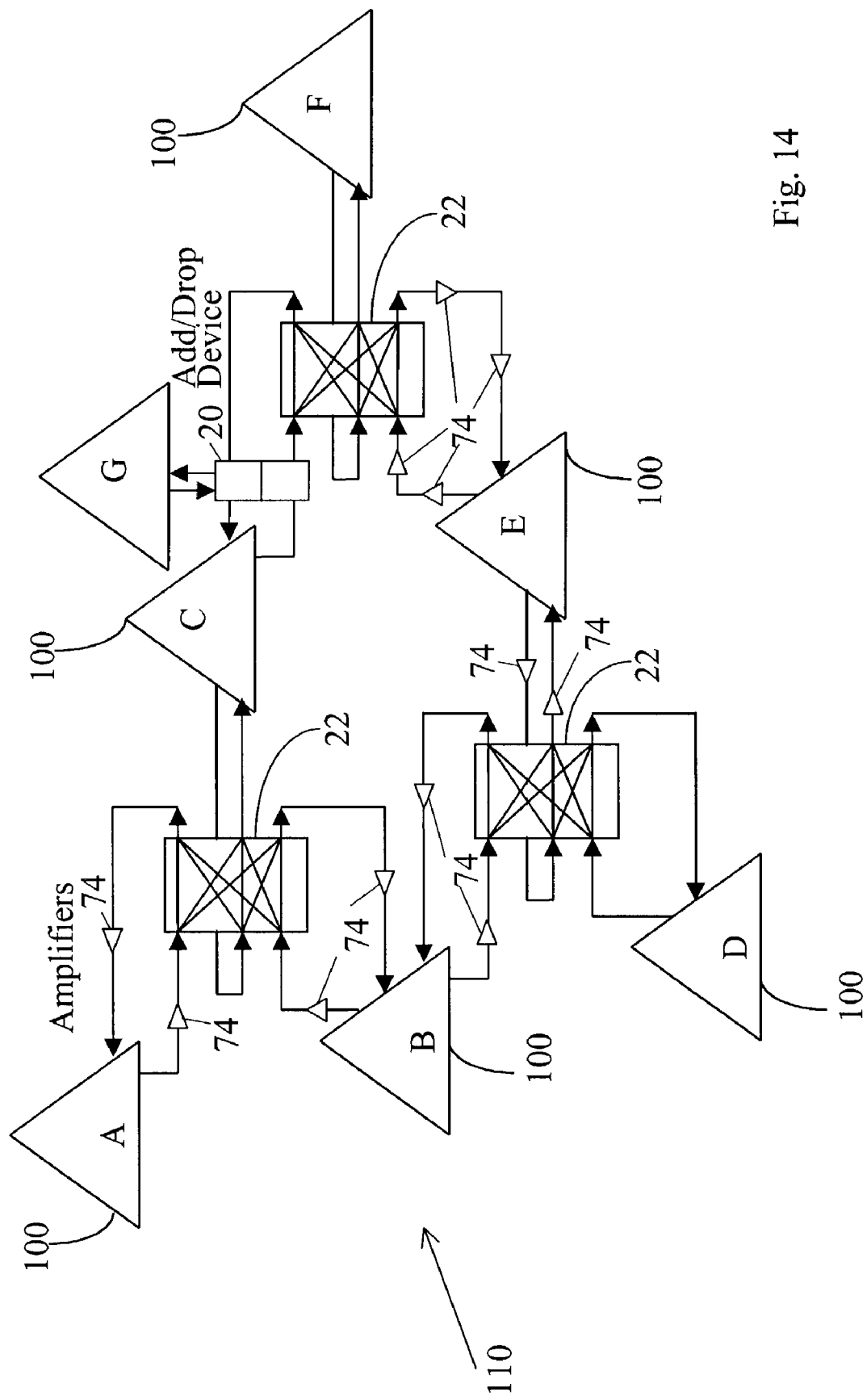

In systems 10 of the present invention, the switch 22 can be used to optically connect a transmitter and a receiver (FIG. 2) in a 1×1 configuration or a plurality of nodes 100 in an n×m configuration (FIGS. 13-14). In a 1×1 configuration, the switch 22 can be useful for dropping wavebands or for varying the waveband characteristics (gain trimming) of the signal.

The nodes 100 used in the system 10 may contain various system components including optical transmitters, receivers, and/or other processing equipment, such as switches depending upon whether the node is an origination (transmitting signals) and/or a destination (receiving signals) node, and whether it is a terminal node. The system 10 may further include other optical transmission equipment, such as optical amplifiers 74, and other optical processing nodes 20, such as optical add/drop multiplexers, between the switches and the nodes 100 as may be useful in a given system.

The 4×4 switch arrangement shown in FIG. 13 is representative of a north-south-east-west communication system. One skilled in the art will appreciate that the nodes/switch arrangements can be varied to accommodate various network configurations. For example, a 3×3 arrangement is shown in FIG. 14. The arrangements in FIGS. 13 and 14 show the cross connections of the switches 22, but do not show the waveband selectors within the switches 22.

The flow of communication traffic between the nodes can take place using a variety of optical waveband hierarchies. In an embodiment, the optical wavebands are established and wavelengths assigned based on both the signal origination node and the signal destination node to avoid the need for wavelength conversion in the optical network.

For example, the spectrum of wavelengths used with each receiver can be divided into wavebands and the destination wavebands assigned to transmitters. The assignment may be static or dynamically controlled at the network management level so no overlap occurs in the wavebands assigned to each transmitter from the various receivers. Dynamic control of the waveband assignment provides flexibility in the wavelength management in the system 10 and can be performed at various points in the system, such as at the client system, e.g., SONET, SDH, ATM, IP interface with the optical network.

Waveband hierarchies in which the origination and destination nodes are paired are particularly useful in communication systems in which a signal is being sent from the origin to one destination, such as in telephone communication systems. In addition, the present invention can also accommodate the necessary protection systems to provide multiple paths to the same destination by proper allocation of the wavelengths.

In a multiple destination system, such as a cable television system, it may be more appropriate for the wavebands to be determined based solely on the origination node of the signal. Waveband selectors can be included in the switches 22 to pass signals corresponding to a particular source to any number of destination nodes. The switch 22 can provide further control over the distribution of signals by passing broadcast signals to a distribution segment only upon a subscriber's request. The CATV provider, in response to a programming request, can centrally control the switch to deliver the signal to the requester. In the absence of an express request by a subscriber the signal would not be broadcast to the segment. The limited availability of the signal on a segment may discourage pirating of programming signals.

Switches 22 of the present invention can also be used for remote switching and routing of communication traffic in the event of a fault in the system. For example, in FIG. 13 if a signal were to travel from node A to node C, the typical path would be through the switch connected between nodes A and C. However, if a fault occurs in the line from the switch to node C, it may be desirable to route traffic from node A through node D to node C. Upon detection of the fault, the network management system could reconfigure the switches 22 in the system 10 to reroute the traffic or switch to a previously configured protection route.

As can be seen, the present invention provides for flexibility in optical transmission systems. In addition, the present invention provides for increased transmission capacity without the commensurate increase in complexity that was present in the prior art systems.

Figure 15:
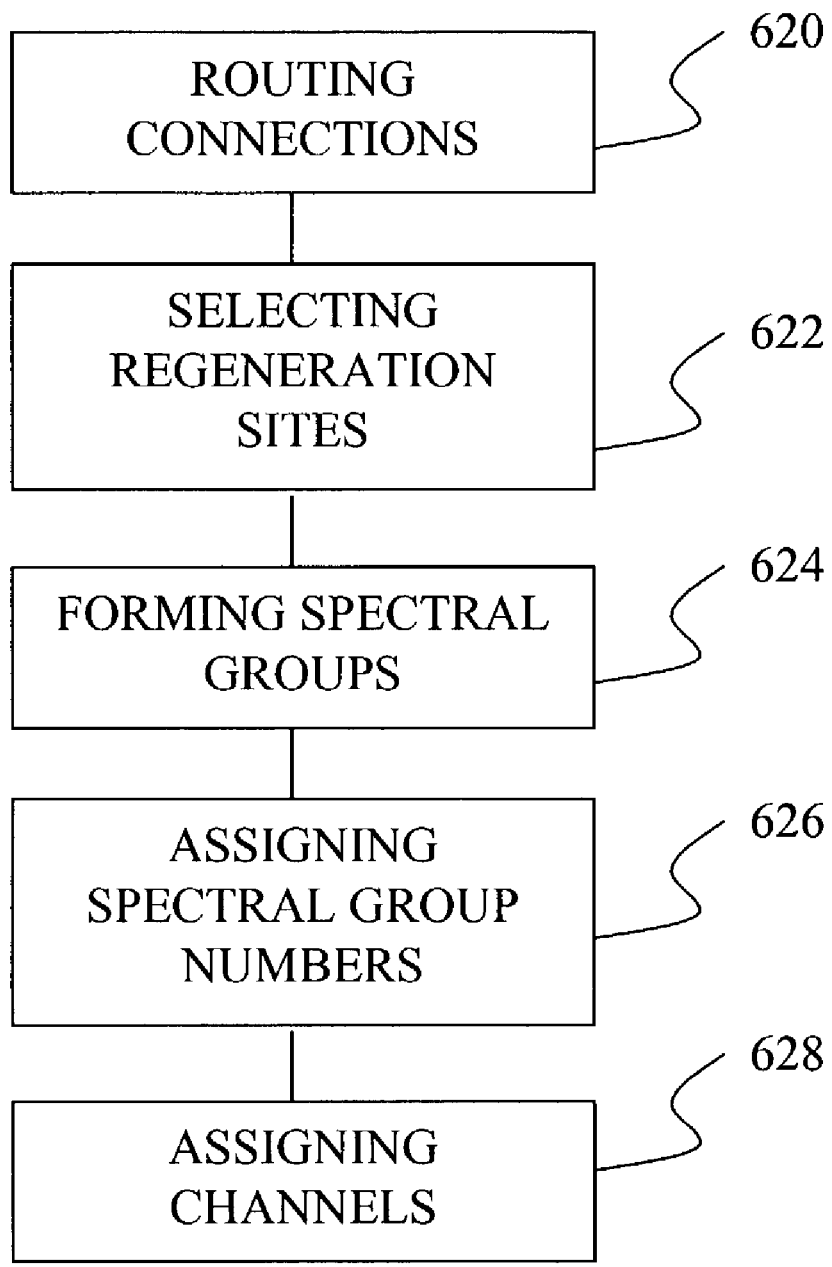
FIG. 15 shows an overview block diagram of methods of the present invention.

FIG. 15 is a block diagram of methods that can be used to form systems 10 and SGRs 11 using spectral groups according to the present invention. Those methods allow for reducing the amount of regeneration, efficiently utilizing bandwidth, and providing a high degree of reliability. Those methods may be performed individually or in combination with all or some of the other methods, or in conjunction with other methods, such as span engineering. Those methods include routing connections 620, selecting regeneration sites 622, forming spectral groups 624, assigning spectral group numbers 626, and assigning channels 628. Each method will be discussed hereinbelow. Advantages of the methods can be realized with all-optical systems as well as optical/electrical systems, although most of the discussion will be focused on all-optical systems 10.

The method of routing connections 620 will be described with respect to FIGS. 16-18. The method includes determining or specifying the topology of the system 10, including the endpoints of each link and the link distance. The method also includes determining or specifying a set of demands, such as the data rate and the desired level of protection. The method also includes determining or specifying other parameters, including span loss, fiber type, etc.

For all-optical systems 10, the method 620 includes shortest path routing as the starting point, as will be further explored hereinbelow, because costs generally increase with the number of regeneration sites. In contrast, the method includes minimum hop routing for systems where regeneration occurs at every node, because minimizing the number of hops minimizes the number of nodes that are crossed and, therefore, the number of regenerations. Advantages of the present invention may be realized with both shortest path routing and minimum hop routing, and combinations thereof.

The routing method 620 may be performed for both unprotected demands and protected demands, and includes determining the protection level on a per-demand basis or on a group or some other basis. For unprotected demands, routing includes using a shortest path method. For 1+1 protection, shortest dual-path routing can be used, where, if possible, the resulting primary and secondary paths are node and link disjoint. In general, the shorter of the two paths is taken to be the primary path.

Figure 22:
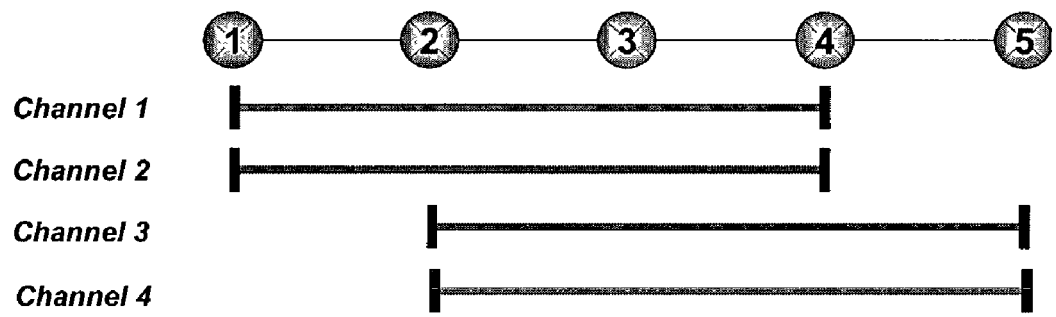

The routing method 620 includes forming dual paths that are not the shortest path plus the second shortest path. As shown in the hypothetical network of FIGS. 16a and 16b, the shortest path between Omaha and Los Angeles is shown by the thick lines. However, selecting this path precludes a second path that is completely link and node disjoint. The optimal dual-path is shown in FIG. 22.

The routing method 620 includes a mode in which 'shortest' is the shortest distance. In this mode, routes are chosen such that the end-to-end path (or the combination of the primary and secondary end-to-end paths) has minimum distance. In another mode, the method includes factors such as regeneration sites, minimizing regeneration sites, optical equipment penalties, and noise figures, so that routes are defined using factors such as the Optical Signal to Noise Ratio (OSNR), which is associated with the Noise Figure associated with each link. In that mode of operation, routing includes 'minimum noise figure' routing.

Another factor that can be used is "optical penalty". Each piece of optical networking equipment (e.g., Router, OADM, etc) has an optical penalty associated with it. When calculating shortest path (whether based on distance or noise figure), the routing method 620 includes determining the optical penalties of routes. For example, the method can calculate an effective distance for each link that is comprised of the actual distance of the link, plus half of the optical penalty at one link endpoint, plus half of the optical penalty at the other endpoint. Using half of the penalty at each end allows the link direction to be ignored when calculating shortest path. If a node is an intermediate node on a path, the path will contain a link into and out of the node, thus, the whole optical penalty will be counted at that node. For end points half of the optical penalties can be counted, although when determining the shortest path between a set of endpoints, the penalties at the endpoints do not play a role since they will be the same for all paths.

Furthermore, the method 620 includes distinguishing between the penalty suffered by traffic that optically passes through a node 11 as opposed to traffic adding/dropping at the node 11, and assigning different optical penalties for the different traffic patterns. For example, optically passing through an OADM will result in a noise figure and distance penalty. If signal channels are added/dropped at an OADM, the corresponding penalties may be different.

In addition to determining the shortest path, the method 620 also includes selecting one or more possible alternative paths for each connection. The method 620 includes generating a list of possible paths. For example, the method 620 includes routing all connections along their most desirable path (without regard to link capacity), determining where the hot-spots are in the network (i.e., the spots in the network that are likely to become congested), searching for alternative paths that avoid these hot spots (while enforcing additional rules such as alternative paths should have no more than N extra regenerations—we have found that N can often be set to 0 and still provide useful alternative paths), and identifying one or more of the alternative paths. In some cases, an alternative path may have fewer regenerations than the "shortest" path (e.g., due to electronic termination sites being present, or due to the actual lengths of the primary and secondary), in which case the method includes selecting the alternative path as the preferred path.

After generating the shortest path and any alternative paths for each connection, routing of the demands is performed. For each connection, the method includes choosing a path such that the network is left in the least-loaded state (i.e., the Least-Loaded algorithm). In other words, the method identifies the "most loaded link" in the path, and can chose the alternate path in which the most load link carries the lightest load.

In general, it has been found that the relatively sparsely interconnected systems 10 do not result in a large number of alternative paths. Thus, alternative path routing produces only small gains in these networks. It has also been found that, for purposes of efficiently packing spectral groups, routing connections over the same path, rather than splitting them up over several paths, produces somewhat better results.

As systems 10 become more heavily loaded, the shortest path, or shortest dual-path, for a particular connection may not have enough free capacity to support the connection. Rather than immediately add a second fiber to the congested links, the method includes searching for alternative paths when such new demands are made. Even if the alternative path requires more regeneration, it may be less expensive than populating a second path 26 with amplifiers and upgrading the nodal equipment to support the additional path 26.

In some systems 10 it is desirable to provide 1+1 protection paths, but the presence of spurs or other degenerate topologies in the topology prevents completely node- and link-disjoint primary and secondary paths. The routing method includes identifying common nodes and/or common links which prevent complete disjoinder and, if appropriate, authorizing the use of common nodes or links for protection paths. In that case, the method includes finding the shortest dual path, such that the number of common nodes/links is minimized. If in the routing process, the shortest such path does not have free capacity, alternative paths can be considered, with or without limitations on the number of common nodes/links. FIG. 17 illustrates an example of 1+1 protection over a common link and nodes (i.e., nodes D and E and the link therebetween). In that example, the degenerate case is not a spur, although a system 10 having a spur is analogous.

The method of the present invention can allow for common nodes and common links to be authorized. As another example, in the network of FIG. 18, if the method allows for common nodes but not common links, a primary and secondary path can be found from A to E using common node B (i.e., paths ABCE and ABDE), but not from A to F, which would require the authorization of link EF to be in common.

Figure 19:
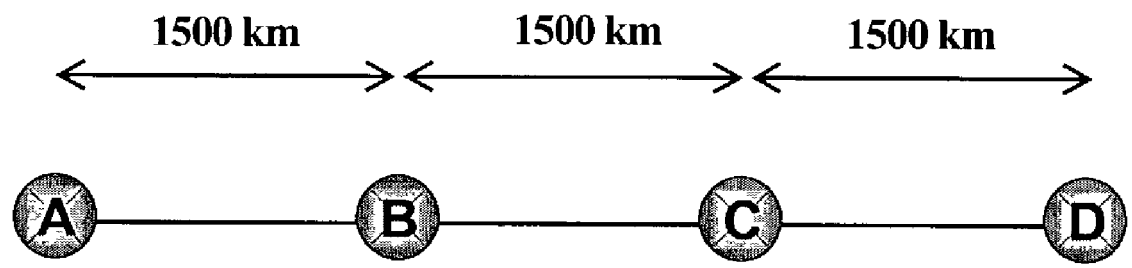
FIG. 19 shows an example of a method for selecting a regeneration site.

The method for selecting regeneration sites 622 will be described with respect to FIG. 19. The method 622 is particularly relevant in all-optical systems 10. The method 622 can be used in conjunction with one or more other methods, such as to form all-optical systems 10, or it may be used alone to plan regeneration sites. The method 622 has several features, one or more of which may be used.

The need to regenerate channels, or optical reach, in a spectral group depends on the maximum distance that the channels can travel without loss of data. The optical reach can vary from channel to channel depending on such factors as fiber type, amplifier span lengths, optical equipment penalties, etc. There is often flexibility as to where regeneration can occur, as illustrated in the example of FIG. 19. Assume that the connection from A to D needs to be regenerated once, and that regeneration can occur at either node B or C. In general, spectral group packing is more efficient when regenerations occur at the same site. Thus, the method can be made to choose certain sites for regeneration. For example, node B may be consistently chosen over node C as the regeneration site. This is not to say that the site becomes a dedicated regeneration site. Connections not requiring regeneration will still optically bypass the site.

Also, the method can specify some sites as 'not preferred for regeneration' (e.g., an office with limited space). At such sites, regeneration will only occur if absolutely necessary. Thus, in the example of FIG. 19, if B is a non-preferred regeneration site, node C would be chosen instead.

The method can determine whether the system 10 should include an optical/electrical hybrid portion including dedicated regeneration sites. For example, if a link has a distance of 6,000 km, and if the system reach is 4,000 km, a dedicated regeneration site could be added along this link in an appropriate location. The site could be, for example, 'back-to-back' transmitters and receivers.

The regeneration method can also select regeneration sites to vary the amount of equipment required in the system 10. Selective regeneration of the signal channels in one or more spectral group can be performed at a node 11 to avoid the need to deploy a regeneration node where such a node would not otherwise be needed.

Regeneration site selection can also take into account other factors, such as the distance, accumulated noise figure, OSNR, etc. For example, if the method is in the 'route on distance' mode, regeneration is based on the length of the links and the 'distance penalties' of the equipment.

Another factor is the maximum number of optical nodes 11 that can be transited before transients and/or accumulated crosstalk becomes a problem. If a threshold is crossed, the signal is regenerated, independent of the length of the path.

The method of forming spectral groups 624 will be described with respect to FIGS. 20-23. As with the other methods, the method of forming spectral groups 624 may be used in conjunction with one or more other methods, or it may be utilized by itself. If the method is used to form a system 10 using spectral groups, it can be advantageously utilized after the methods of routing connections 620 and selecting regeneration sites 622.

Spectral groups typically are designed to have a maximum number of channels, and can be populated with any number of channels from zero to the maximum.

The method of forming spectral groups 624 includes determining whether the segment of the connection that falls between two regeneration points (or between an endpoint and a regeneration point) is a subconnection (if a connection has no regenerations, then the subconnection is equivalent to the connection). In general, spectral groups are formed by grouping subconnections, not end-to-end connections.

Initially, all subconnections that have the same two endpoints are bundled together. It is usually desirable to minimize the number of bundles formed. An important feature of the method is grouping the channels in such a way as to form spectral groups with a high fill rate. However, there are situations where a bundle must be split into multiple smaller bundles (e.g., moving some subconnections to a new bundle) For example, at SGR nodes it is advantageous to bundle together subconnections that will be transmitted and received at the same location. The subconnection bundle can be split such that all subconnections in the resulting smaller bundles have the same transmitter and receiver location. Also, if a bundle contains more subconnections than the maximum number of channels in the spectral group, it needs to be split such that the resulting smaller bundles contain no more than this maximum.

After the bundles are formed they are referred to as spectral groups (SGs). The method includes determining how many spectral groups have been formed on each link. The maximum number of SGs is a feature of the system 10 and the nodes 11 which is determined or provided earlier in the method.

If the maximum number of SGs is exceeded on a particular link, then the spectral grouping method includes combining or joining two or more SGs together to form a single SG. Three processes will be discussed: subsetting, merging, and branching. Those processes can make use of consolidation and/or broadcast features in various optical processing devices to reduce the number of spectral groups used in the optical link. However, such reduction typically results in some unusable bandwidth, as will be further described. One or more of the combining methods can be used in allocating connections to spectral groups and channels.

The steps of combining SGs include checking that the constituent subconnections can be combined into the same SG. For example, the total number of subconnections assigned to channels in the resulting SG cannot be greater than the maximum number of channels allowed. Other channel allocation rules, can also be included in the combining steps. Furthermore, the combining steps can include determining whether it is possible to combine certain SGs because of the need to keep the subconnections corresponding to certain primary and secondary connections in separate SGs.

The first SG combining method is subsetting. Consider the example shown in FIG. 20, which illustrates a SG that runs from Node 1 to Node 4 that contains two subconnections, a second SG that runs from Node 1 to Node 3 that contains one subconnection, and a third SG that runs from Node 2 to Node 4 that contains one subconnection. All three SGs can be combined to form a single SG that extends from Node 1 to Node 4, with the resulting SG containing four channels, each of which is assigned to a subconnection.

Figure 20:
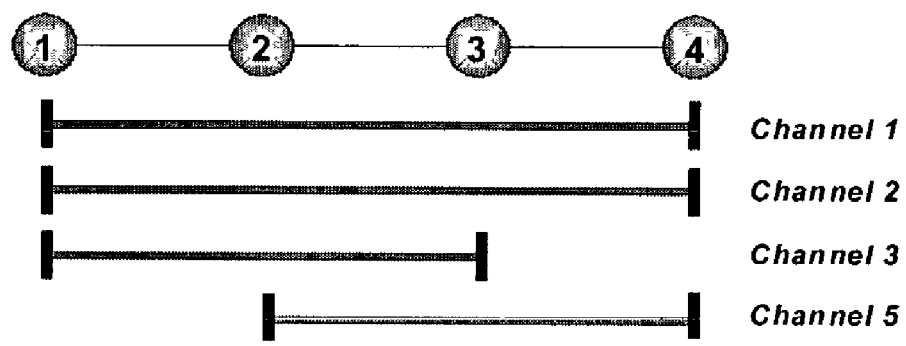
FIGS. 20-23 show methods of forming spectral groups.
Figure 21:
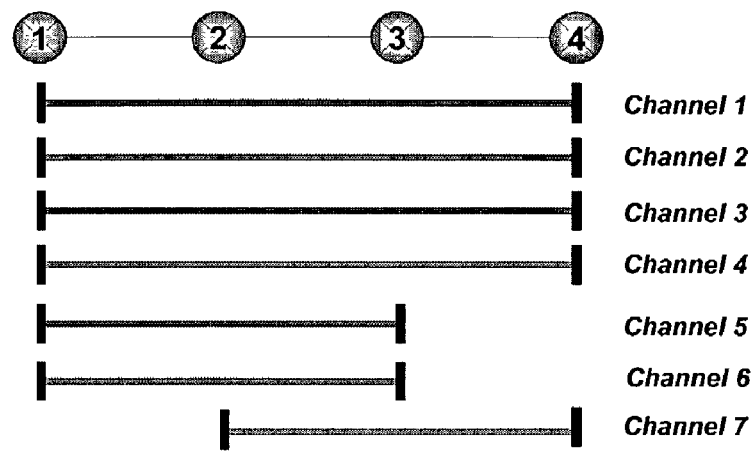

The example of FIG. 20 illustrates the broadcast, or 'drop and continue', feature of the system. Individual wavelengths can be dropped from the SG at any node. It is not necessary that all wavelengths in the SG have the same source and destination nodes. In FIG. 20, for example, the SG drops channel 3 at Node 3, but the SG continues on to Node 4 where the spectral group is terminated.

It is noted that in the FIG. 20 example, channel 3 is unavailable for use on the link between Nodes 3 and 4, and channel 5 cannot be used between Nodes 1 and 2.

The subsetting method can consider efficiency when performing the subsetting operations. For example, a spectral group that extends over M links has a capacity of M*N channel slots, where N is the maximum number of channels per spectral group. The efficiency, or fill-rate, is determined by dividing the actual number of channel slots used by the maximum capacity. In the example shown in FIG. 21, the total capacity is 3*8=24 channel slots. Of these, 18 are used, yielding a fill-rate of 75%. Two factors contribute to the fill-rate: the amount of unusable bandwidth (for example, Channel 5 from Node 3 to Node 4), and the amount of unused bandwidth (for example, in the figure, there are only seven subconnections in the SG). In lightly loaded networks fill-rate can be normalized based on the number of channels used in the SG.

Accordingly, the subset method can first join together subconnections to increase the fill rate where the resulting fill rate exceeds a certain threshold, or efficiency. If that is still not sufficient to produce a feasible solution, the method can reiterate, with the efficiency threshold lowered.

The merging method operates to merge channels in two SGs from different links that are the same or include at least one common channel. In the example of FIG. 22, one SG extends from Node 1 to Node 4, and a second SG extends from Node 2 to Node 5, with both SGs containing two subconnections. The two SGs can be merged into a single SG that extends from Node 1 to Node 5. The method can check that the path from Node 1 to Node 5 does not require regeneration due to the accumulation of noise from the merged spectral groups. The method can also check that no optical rings have been formed when merging the SGs.

In the example of FIG. 22, channels 1 and 2 cannot be used on the link between Nodes 4 and 5, and channels 3 and 4 cannot be used on the link between Nodes 1 and 2. As with subsetting, the percentage of overlapping links can be taken into account when the merge method is performed.

The branching method can also be used to combine spectral groups. While subsetting and merging take advantage of the ability to drop one or more channels at a node and continue the SG to further nodes, the branching method takes advantage of broadcasting over multiple links at a node (such as a node equipped with an SGR). Consider the example of FIG. 23. One SG runs from Node 1 to Node 5, another from Node 1 to Node 6. The two SGs can be combined to form a single SG. In the West to East direction, the optical router at Node 4 broadcasts the SG onto the link between Nodes 4 and 5 and the link between Nodes 4 and 6. In the reverse direction, the optical router consolidates the signals from these two links. Note that it would also be possible to have a third subconnection in this SG that extends from Node 1 to Node 4, whereby the optical router would be performing a 3-way broadcast and consolidation.

Figure 23:
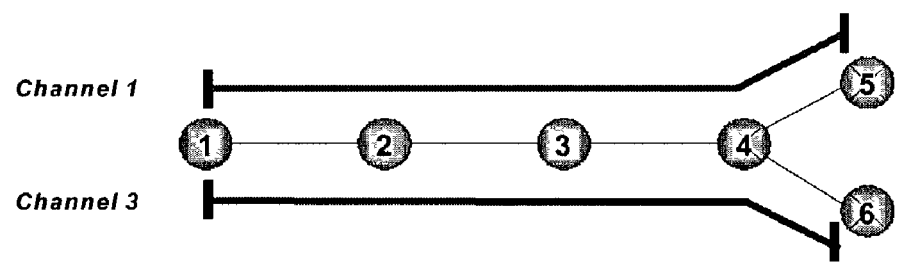

In the example shown in FIG. 23, channel 1 is not utilized on the link between Nodes 4 and 6, and Channel 3 is not utilized on the link between Nodes 4 and 5. As with the other combining operations, the percentage of overlapping links between SGs is considered.

The branching method tends to be more useful in a highly interconnected system 10 than in a sparsely interconnected system 10. As with merging, the noise accumulates with each link. Thus, in the example of FIG. 23, if the branching method calculates the OSNR, it should do so over all five links to determine if the resulting SG is within the regeneration bounds.

The method of forming spectral groups 624 will be described with respect to FIGS. 20-23. The regeneration method may be used independently or it may be used in conjunction with one or more other methods. For example, it may be performed prior to the routing step for forming spectral groups. Alternatively, the regeneration method may be used alone to plan regeneration sites. The regeneration method has several features, one or more of which may be used.

The method of forming spectral groups 624 can be used to fit new subconnections into existing SGs when new demands are added to an existing network. For example, the method can fit subconnections into SGs that have the same source and destination, analogous to the initial steps of the spectral grouping method. For example, the first steps can be fitting the new subconnections into spectral groups including the same subconnections. If the number of resulting SGs (existing plus new ones) is too high, the combining method goes into the combination mode, where it performs subsetting, merging, and branching, as described above. The method can initially move new subconnections into existing SGs as opposed to combining new SGs. The percentage of overlapping links is considered when the new subconnections are combined with existing or new SGs.

The method of forming spectral groups 624 can extend an existing SG. For example, an existing SG may extend between Nodes 1 and 2. A new subconnection that extends from Node 1 through Node 2 to Node 3 may be combined with this existing SG. Thus, the existing SG would be extended to include the link from Node 2 to Node 3. The switching process involved in extending the SG should not affect existing in-service subconnections.

Figure 24:
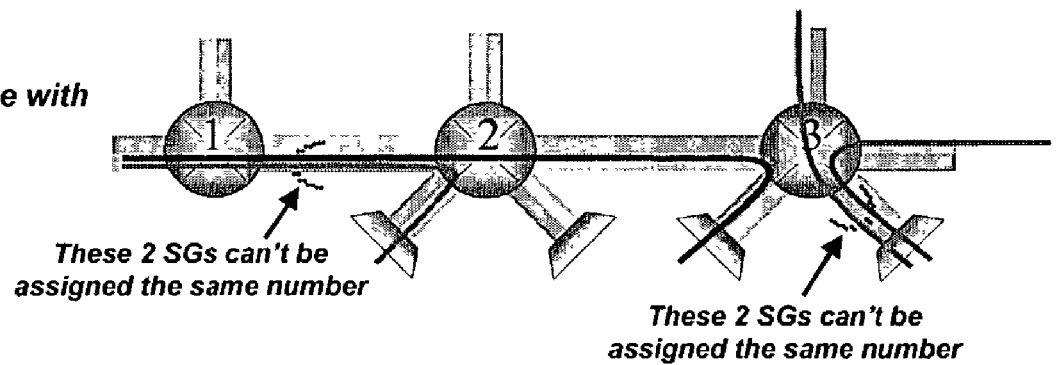
FIG. 24 shows a method of assigning spectral group numbers.

The method of assigning spectral group numbers 626 will be discussed with respect to FIG. 24. This method 626 can be used alone or in combination with other methods. For example, it can be used after the spectral group formation method 624. The spectral group assignment method assigns each spectral group a number from 1 to the maximum number of SGs. The SG numbers can be assigned such that two SGs are not assigned the same SG on a given fiber on a given link, or to any transmitter/receiver. In FIG. 24, four SGs are shown. The two SGs that ride on the link between Nodes 1 and 2 cannot be assigned the same number (assuming there is just one fiber pair per link); similarly, the two SGs that drop at the same transmitter/receiver of Node 3 cannot be assigned the same SG even though they have no links in common.

In addition to selecting an SG number, the method can select a fiber pair for each link of the SG (this is relevant for links with multiple fiber pairs). The method can also make other selections, such as selecting a transmitter/receiver or other device in situations when such selections are available.

The method of assigning SG numbers includes ordering the SGs based on the difficulty of finding a satisfactory assignment. The number of SGs that have been formed on each link and on each optical router ONG is tallied. Each SG is assigned a weighting based on its most heavily utilized link or nodes. Thus, SGs on links or nodes 11 with the most SGs will be assigned first so that there is the most flexibility in assigning the SG number (i.e., as SGs are assigned numbers, there is less flexibility in choosing numbers for the remaining SGs since they have to avoid conflict with those already assigned). For SGs nodes on lightly loaded links or nodes, their assignment order can be based on the number of hops comprising the SG. The greater the number of hops, the more difficult it is to find a free SG number on each one of the hops.

The method can use the Most Used scheme, where an SG number is considered for assignment based on the number of times it has been assigned already. The rationale for this strategy is that the more times a particular SG number is used, the harder it is to assign it to another SG, because the chance of conflict is higher. Thus, if it can be assigned without conflict, it is chosen. If the Most Used scheme does not successfully find an SG assignment that satisfies all SGs, a Least Loaded scheme can be used. The least loaded links and nodes are chosen at each step if possible. In most scenarios there is only one fiber pair per link so that this scheme essentially operates as a First Fit scheme that takes into account loading at the node.

The method of assigning spectral group numbers can also consider factors such as certain SG numbers have restricted optical reach on certain fiber types. This can be taken into account when SG numbers are assigned. When the method utilizes that factor, it includes the step of determining the fiber types comprising each SG and may include further steps to determine whether the fiber types vary on a span-by-span basis. Such assignment schemes include considering the SG numbers with the smallest reach that are still greater than the length of the SG.

Another consideration when assigning SG numbers is that on lightly loaded systems, it is beneficial to have active wavelengths that span the full spectrum, so that the amplifier gain flattening algorithms work properly. Thus, initially, SG numbers can be assigned so that such a spread is achieved, if possible (e.g., SGs may be assigned in the order 11, 5, 17, not simply 1, 2, 3).

Wavelength inventory can also be considered when assigning spectral group numbers. For example, customers may have certain Tx/Rx wavelengths in inventory that they wish to use. The SGs chosen based on the methods described above may not match up with these wavelengths. The spectral group method, however, can utilize the unused Tx/Rx modules that are located at each node and any Tx/Rx modules that are located in a central inventory location. The method can chose to match up with the Tx/Rx in inventory as opposed to the SG numbers that would otherwise be chosen. Preference can be given to using the Tx/Rx that are located at a particular node rather than the ones located in a central 'bin.' This mode of operation may lead to a small decrease in the utilization of the network because the SG assignment process may be less than optimal.

In general, the methods can be operated to avoid single points of failure when implementing protections schemes. For example, avoiding common nodes and links, avoiding common components within a node or, if that is not an option, avoiding common cards within a common component.

Even if the number of SGs formed on each link and ONG is less than or equal to the maximum allowable number, there is no guarantee that the above SG assignment processes will find a feasible solution. There may be too many constraints such that a solution cannot be found. In this case, the SG bundling process can reiterate with a lower efficiency threshold for combining two SGs into a single SG.

If further iterations of the methods still does not produce a feasible solution, then the method can return to the routing step. For example, the method can determines which link has the most SGs, and reduces the maximum number of paths that can be routed on that link. The whole process of routing, regenerating, SG bundling, and SG assignment can be performed again. The process can continue to iterate until a solution can be found.

The method of assigning channels will be described with respect to FIG. 20 and can be performed individually or in combination with other methods. If the channel assignment method is performed with other methods to form spectral groups, it can be performed after the SGs have been assigned numbers.

The methods can operate so that SG and channel assignment is performed on a subconnection basis, so that there is no attempt to assign the same SG number to all subconnections that comprise a connection. Thus, whenever regeneration occurs (which partitions a connection into subconnections), wavelength conversion typically occurs. Sparse wavelength conversion can be very effective in yielding high utilization in a system 10.

Figure 25A:
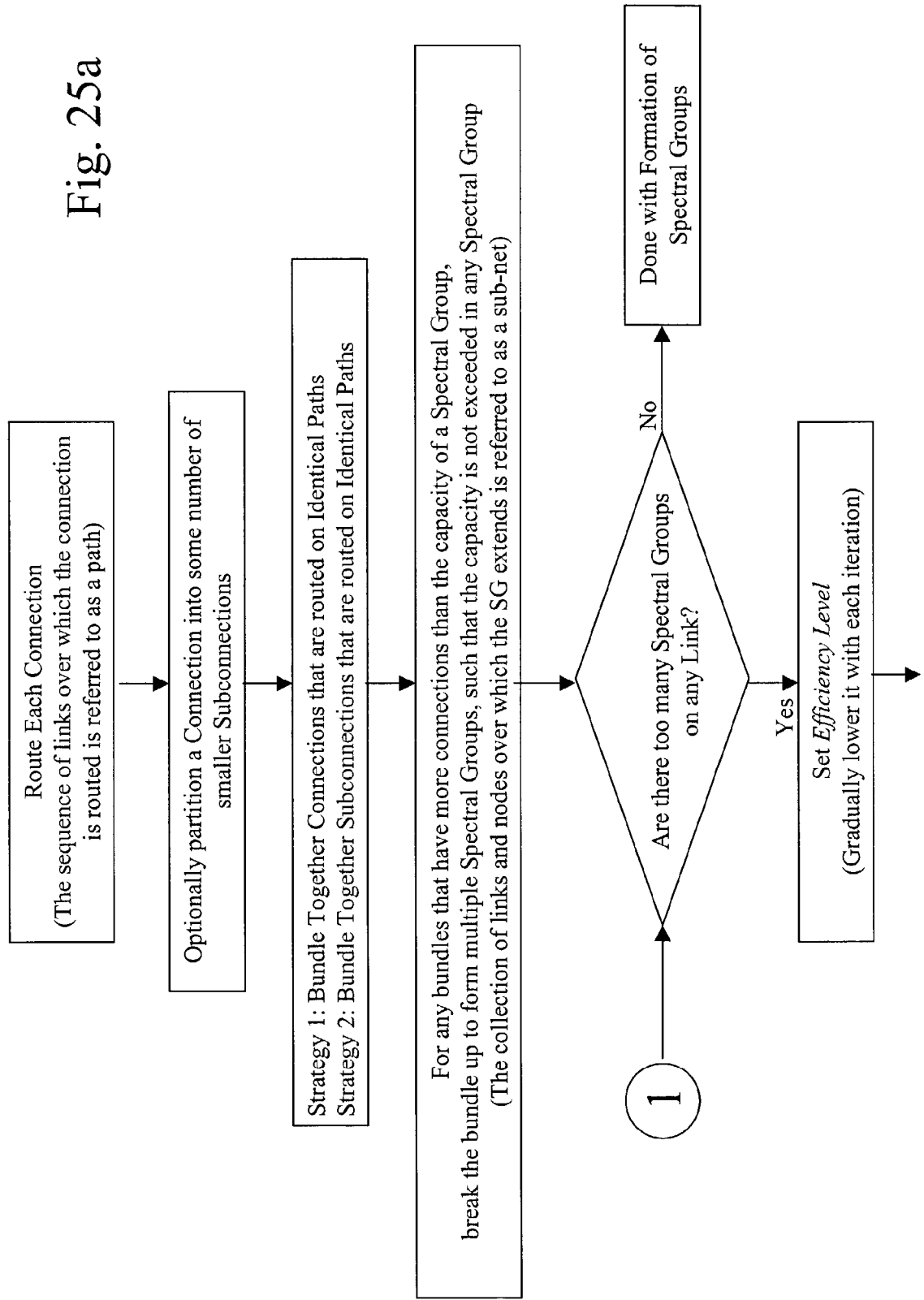
FIGS. 25*a*-25*d* show methods of combining spectral groups.

FIGS. 25a-25d are flow charts illustrating one embodiment of the method of forming spectral groups 624 described above. In FIG. 25a the method begins by routing a connection between an origination node and a destination node. Routing the connection can be subjected to certain criteria. For example, if no protection paths are required, routing a connection may include finding the "shortest" route between the origination node 11 and the destination node. The "shortest" path is not necessarily the path with the shortest fiber length. For example, determining the shortest path may include considering factors such as fiber type, fiber condition, equipment condition, link distances, signal regeneration, signal degradation, amplifier types, and other considerations and optical penalties of a particular path. If a protection path is required, then two paths must be found. For example, in a 1+1 protection scheme, the two paths are node disjoint (except at the origination and destination nodes) and thus link disjoint, which may result in the shortest protection path being longer than the shortest overall path. Nonetheless, the shortest path that satisfies the protection criteria and the second shortest path that satisfies that criteria are typically the primary and secondary paths, respectively. At the origination and destination nodes 11, which are shared even in 1+1 protection schemes, criteria may include ensuring that the primary and secondary paths are assigned to different transmitter/receiver equipment and routers so as to avoid single points of failure in the origination and destination nodes 11.

Once the connections are made, they can be partitioned into smaller sub-connections or sub-networks, such as various optical links interconnecting nodes 11 in the system 10, which is often desirable in large or long-haul systems 10. Thereafter, the connections and/or sub-connections that share the same paths are identified and bundled together to form spectral groups and sub-networks. One or more spectral groups are assigned to those bundled connections and/or subconnections which share the same paths. The reason more than one spectral group may be assigned is that the number of channels may exceed the capacity of a single spectral group. If the number of assigned spectral groups is less than a maximum number allowed number of spectral groups, then individual signal channels within the assigned spectral group can be assigned to each information channel to provision the system 10.

In some networks, however, the number of information channels may be sufficiently large that too many spectral groups are initially formed. As a result, the spectral groups and sub-networks must be further refined to reduce the number of spectral groups. Such refining can be done using the aforementioned concepts of subsetting, merging and/or branching, using various allocation criteria, as will be disclosed in more detail below with respect to FIGS. 25b-25d. One criteria that may be used in the subsetting, merging, and branching operations is a minimum acceptable efficiency of the refined spectral groups. In that way, the subsetting, merging, and branching operations will be forced to meet the minimum efficiency standards when refining the spectral groups. An inefficient system 10 can cause difficulties in the future when additional modifications are made to the network, such as adding capacity or changing traffic patterns.

Figure 25B:
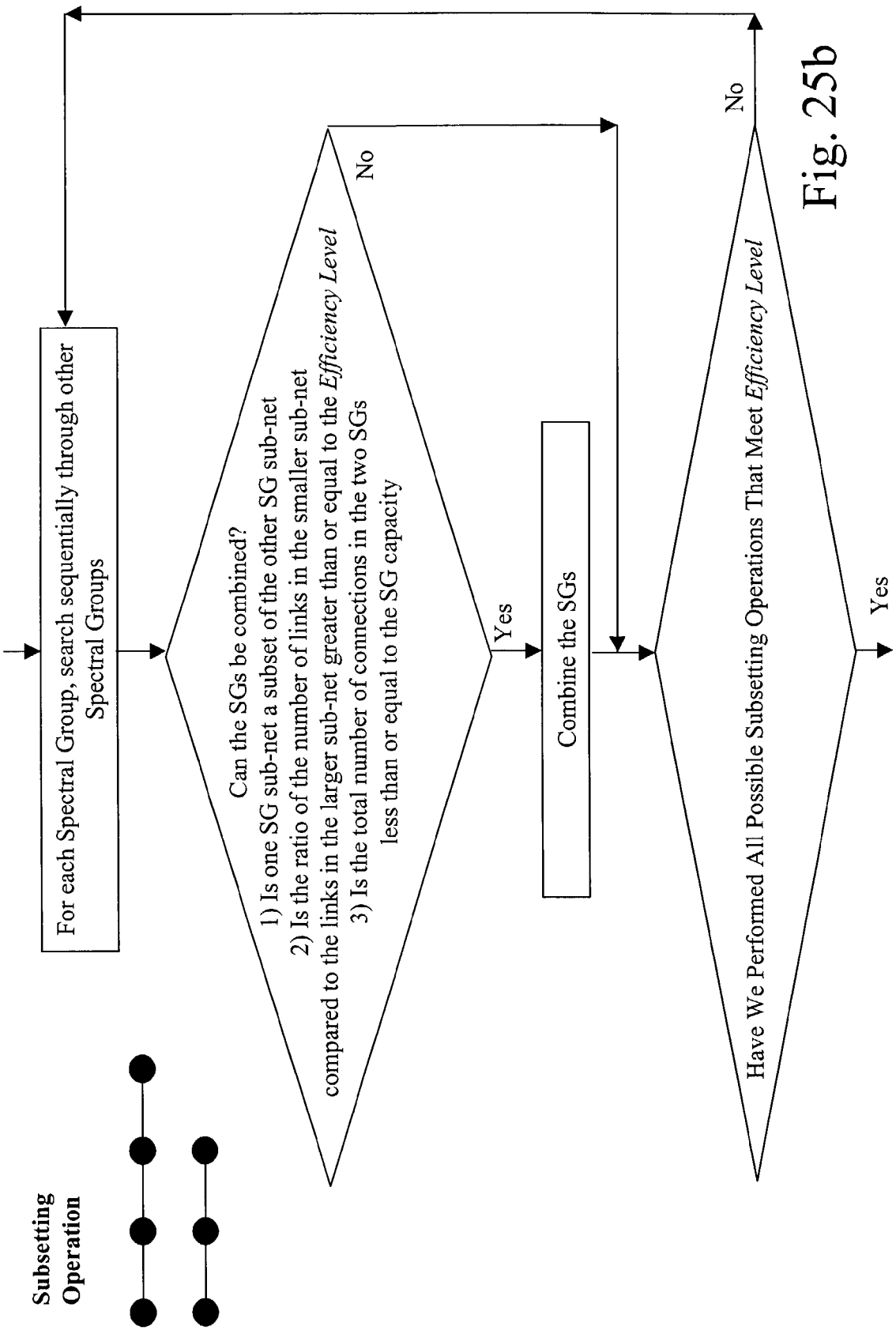

FIG. 25b shows one embodiment of a subsetting operation according to the present invention. In that operation, each spectral group is considered with respect to every other spectral group, to determined whether spectral groups can be combined. An example of a three part test for combining spectral groups is: (1) is the sub-network of one spectral group contained within a sub-network of another spectral group, and (2) is the efficiency of the combined spectral groups greater than or equal to the efficiency level set for the system 10, and (3) is the total number of channels in the combined spectral group less than or equal to the capacity of the spectral group. If the test for combining the spectral groups is satisfied, the spectral groups are combined, and if the test is not satisfied, the spectral groups are not combined. The method can be iterated until all subsetting operations meeting the test criteria have been performed, or until the number of spectral groups is within the acceptable range.

Figure 25C:
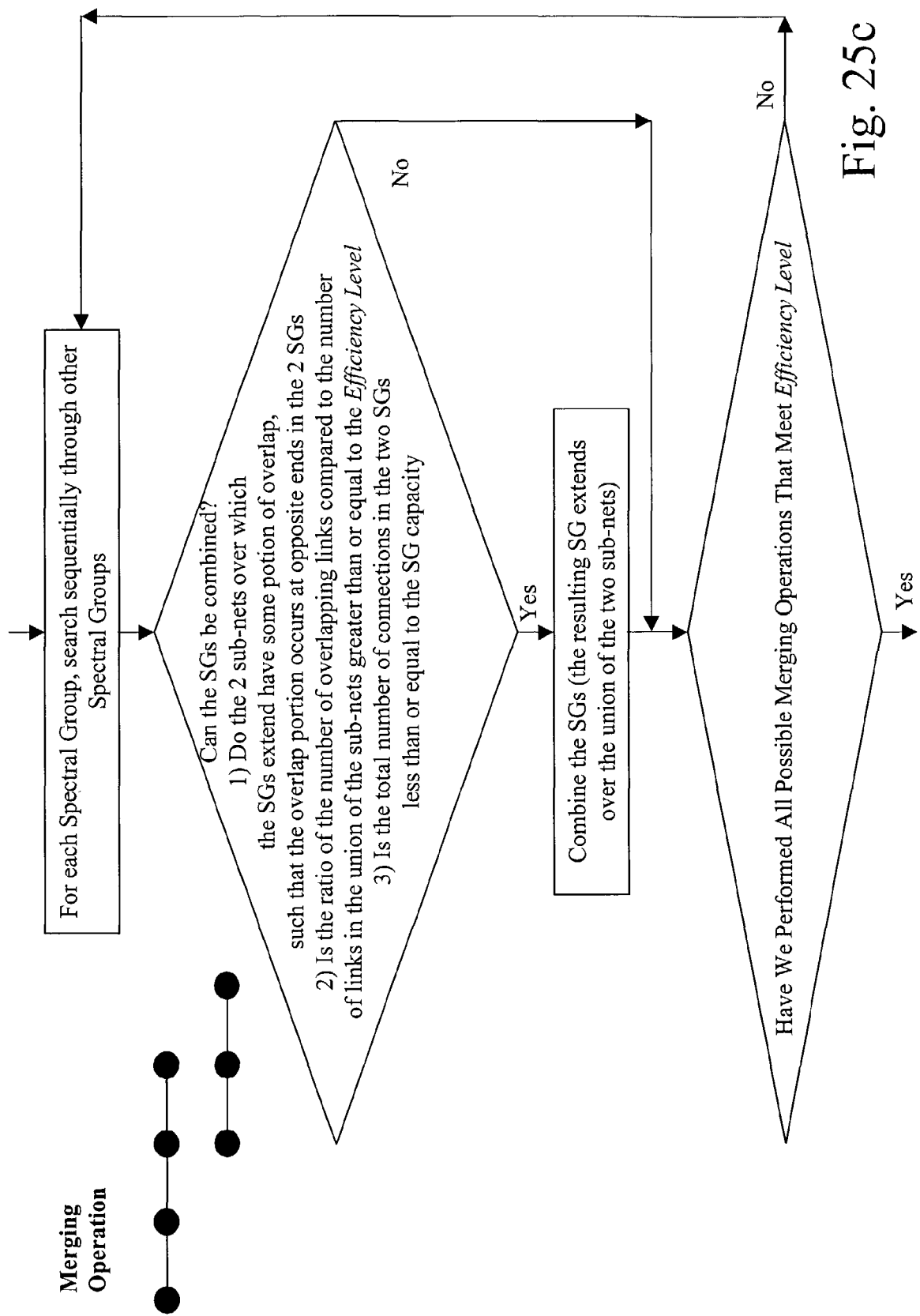

FIG. 25c shows a method for performing a merging operation. That method is similar to the subsetting operation of FIG. 25b, except that the test for merging includes determining whether two sub-networks have an overlapping portion at opposite ends of the sub-networks. In the illustrated method, the test for merging also includes determining whether the merged sub-networks satisfy the efficiency criteria and whether the merged sub-networks will exceed the capacity of a single spectral group.

Figure 25D:
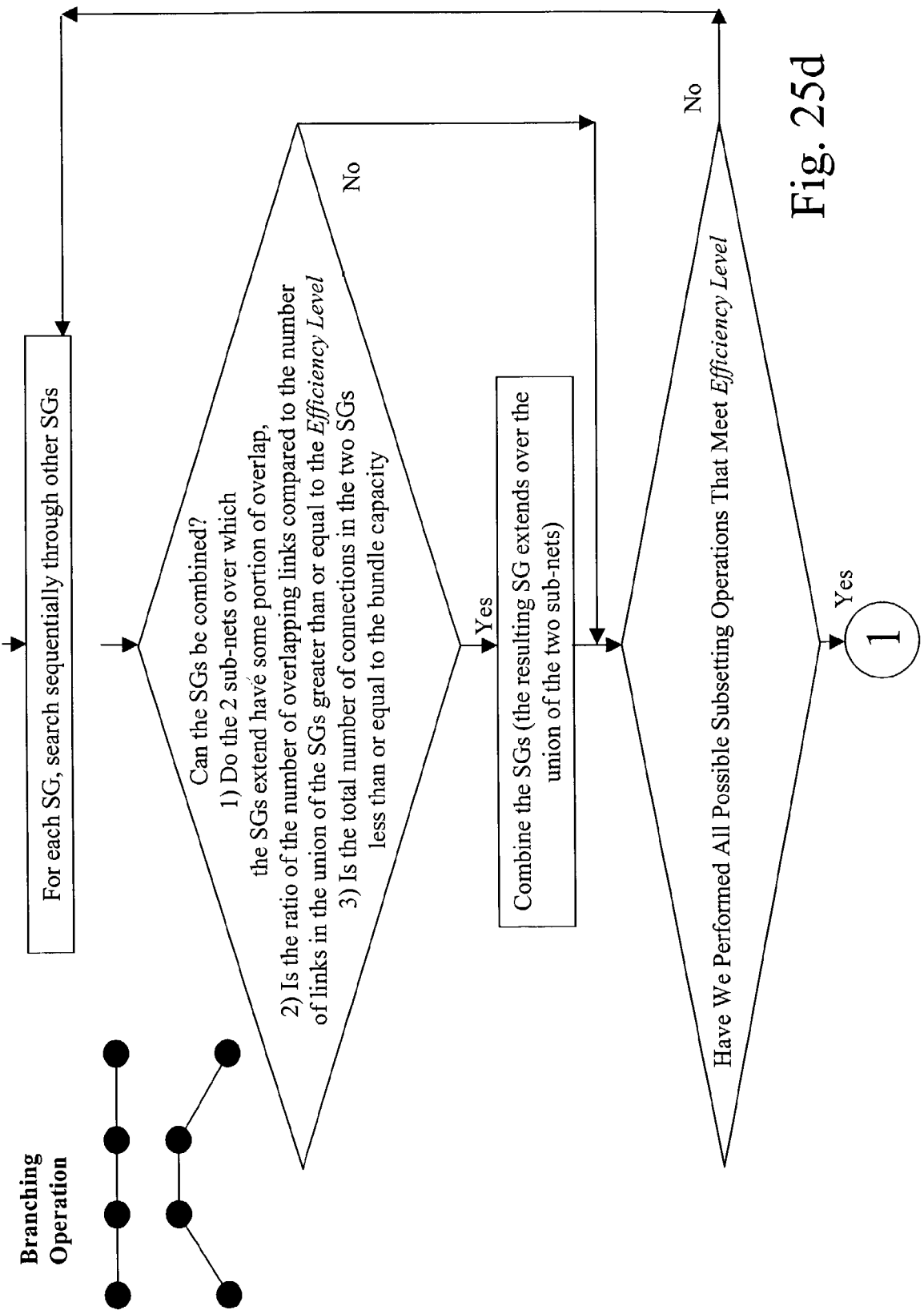

FIG. 25d shows a method for performing a branching operation. That method is similar to the subsetting and merging operations of FIGS. 25b and 25c, except that the test for branching includes determining whether the two sub-networks have an overlapping portion that is in the middle of at least one of the sub-networks. In the illustrated method, the test for branching also includes determining whether the branched sub-networks satisfy the efficiency criteria and whether the branched sub-networks will exceed the capacity of a single spectral group.

After completing the subsetting, merging, and branching operations, the method can return to FIG. 25a to determine whether there are still too many spectral groups. If the answer is no, the method of forming the spectral groups may terminate. If there are still too many spectral groups, the method can lower the efficiency criteria, or change some other criteria, and return to the subsetting, merging, and branching operations to further refine the spectral groups and sub-networks. When returning to the subsetting, merging, and branching operations, the method may return the spectral groups to their original form (as produced by the bundling operation of FIG. 25a) and re-perform the operations with the lower efficiency criteria. Alternatively, the subsetting, merging, and branching operations may be performed on the spectral groups as they exist after the last subsetting, merging, and branching operations. In the later case, however, the operations may become more complex, such as when calculating the efficiency of spectral groups including two or more channels with different paths. Furthermore, by not returning the spectral groups to their original form, the operations will lose the opportunity to make certain combinations which were prohibited by the efficiency criteria in a previous iteration.

The methods discussed with respect to FIGS. 25a-25d are illustrative of the present invention. Variations on those methods, such as searching and comparing only some of the spectral groups for the various subsetting, merging, and branching operations, as opposed to comparing all subsets to all other subsets, can of course be utilized in according with the present invention. Furthermore, although the various operations are disclosed as being used together, one or more of the operations may be used separate from the rest. Also, the order of the steps and operations can be modified and still realize the benefits of the present invention.

In the present invention, systems 10 can be configured to operate as an all-optical or optical/electrical hybrid network in which the nodes in the network are assigned various nodal tiers depending upon the role of the node in the network. For example, a two nodal tier network can be constructed with major and minor nodes. The number of tiers used in the network can vary depending upon how the artisan chooses to implement the architecture. Each nodal tier in the network will be assigned various attributes to meet network design objectives.

Figure 26:
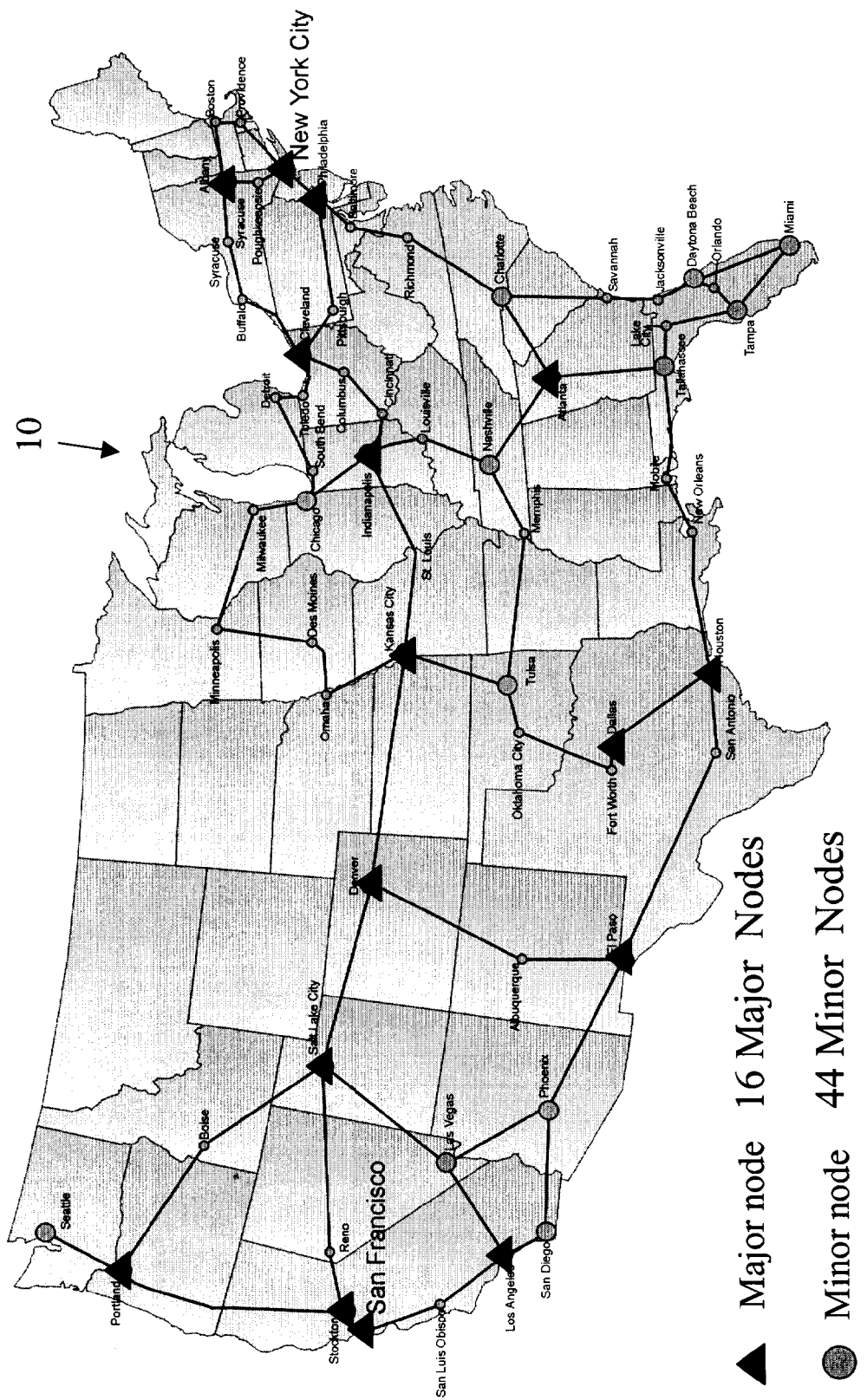
FIG. 26 shows a network according to an embodiment of the present invention.

FIG. 26 shows a network map of the system 10 including 60 nodes. In an embodiment, the network can employ two nodal tiers consisting of 16 major nodes and 44 minor nodes. Major nodes can be assigned to nodes that have significant traffic capacity requirements in terms of being a source, destination, or pass-through point in the network. Also, these nodes could play a critical function in the network, such as being at the intersection, or junction point, of a network where multiple paths through the network intersect or connections are made to other networks. In addition, the major nodes can serve as aggregation hubs for traffic originating from or destined for minor nodes and/or from other networks. As such, the major nodes can include interfacial switching devices and/or integrated switching devices that allow for the establishment of optical transmission paths across multiple fibers in the network or connections are made to other networks.

Conversely, the minor nodal tier can include nodes that do not have a significant traffic capacity requirement. The traffic connectivity requirement of minor nodes may extend to or beyond adjacent major nodes. Traffic originating from a minor node can be extracted from the network at the adjacent major node, irrespective of whether the traffic is destined for nodes beyond the adjacent major node. At the adjacent major nodes, the traffic can be aggregated with other traffic from other minor nodes or external network for transit throughout or beyond the network. Likewise, traffic destined a minor node can be transmitted to an adjacent major node, where it will be separated from the other traffic and forwarded to the minor node.

The number of wavelengths assigned to nodes will depend upon the traffic capacity of the nodes and the type of node. For example, major nodes can have one or more dedicated wavelengths assigned to a connection to other major nodes in the network. The connectivity requirements of major nodes can be defined based on the physical network connectivity and the traffic connectivity through the network. The wavelengths assigned between two major nodes can traverse the same or different paths through the network. For wavelengths traveling the same paths, the wavelengths can be grouped into a common waveband, or spectral group, which can be handled by a single optical switching device. The wavelengths dedicated between major nodes can be unique wavelengths throughout the network and/or wavelengths that are unique to a sub-network of the network. For example, the same wavelength can be used to connect New York and Boston, as well Los Angeles and San Francisco, because these connections generally cover diverse paths through the network.

One or more wavelengths can be assigned to minor nodes in the network. Traffic can be added and dropped at the minor nodes using various wavelength reuse and non-reuse add/drop devices. For example, wavelengths assigned to a minor node can provide connectivity to adjacent major nodes in the network. In various embodiments, the wavelengths from minor nodes are terminated at the adjacent major nodes and the traffic aggregated for further transmission in the network or distribution to other networks. In this manner, the number of wavelengths assigned to a minor node tier can be kept to a minimum.

Figure 27:
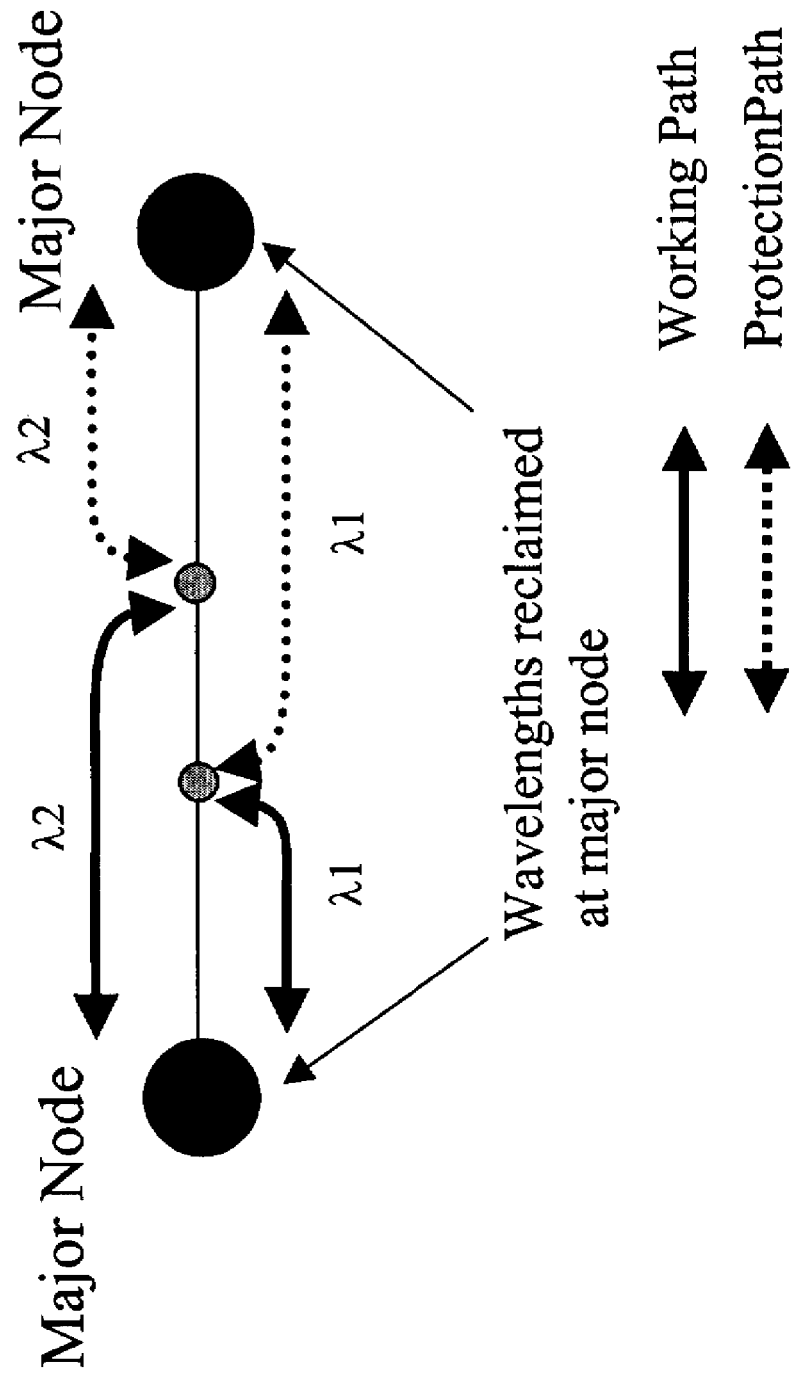
FIG. 27 shows protection and working paths for minor nodes according to the present invention.

As shown in FIG. 27, wavelengths assigned to minor nodes can be reclaimed at adjacent major nodes. In addition, one adjacent major node can provide a working path for the minor node traffic, while another adjacent node can provide a protection path using the same wavelength, if there is a failure of the working path.

The multiple tiered nodal architecture provides a basis for an all-optical express network that can also handle traffic from minor nodes in the network without excessive switching equipment, electrical regeneration, or the implementation of separate back haul networks for minor nodes. In various embodiments, major and minor nodes are implemented in an all-optical network, which includes optical switches and add/drop multiplexers integrated into the transmission system to provide all-optical connectivity between the nodes. In addition, electrical regeneration, switching, grooming, and/or aggregation can be performed by interfacial switching devices working in conjunction with the optical switches and add/drop multiplexers and transmitters and receivers in the network.

It will be appreciated that additional tiering beyond two tiers can be performed to accommodate various network objectives. For example, a major node tier can be subdivided into two major node tiers with different hierarchical attributes, such as capacity and/or line rates. Similarly, multiple minor node tiers can be assigned; for example, a wavelength reuse minor node tier and a no wavelength reuse minor node tier. It will be appreciated that this network architecture combines the efficiencies of grooming and aggregation to reduce the number of wavelengths with the economies of scale offered by transparent optical equipment.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical system comprising:
a first network tier including a plurality of nodes optically interconnected by at least one optical communications path;
a second network tier including a plurality of nodes disposed along the at least one optical communications path interconnecting the nodes in the first network tier, wherein:
the nodes in the second network tier are connected to at least one of the nodes in the first network tier via the at least one optical communications path interconnecting the nodes in the first network tier,
at least some traffic between the nodes in the first network tier travels through the at least one optical communications path and through at least one of the nodes in the second network tier without undergoing an optical-electrical-optical conversion,
the nodes in the second network tier are configured to transmit all traffic to an adjacent node in the first network tier via the at least one optical communications path interconnecting the nodes in the first network tier, wherein the adjacent node in the first network tier is part of a working path for the traffic from the nodes in the second network tier, and the nodes in the first network tier are configured to transmit traffic to and receive traffic from other nodes in the first network tier and the nodes in the second network tier on the at least one optical communications path interconnecting the nodes in the first network tier.

2. The optical system of claim 1, further comprising a third network tier of nodes optically interconnected by at least one optical communications path, wherein the first and third network tiers have different hierarchical attributes, and wherein:

the nodes in the second network tier are connected to at least one of the nodes in the first and third network tiers via the at least one optical communications paths interconnecting the nodes in the first and third network tiers, at least some traffic between the nodes in the first and third network tiers travels through the at least one optical communications path and through at least one of the nodes in the second network tier without undergoing an optical-electrical-optical conversion, the nodes in the second network tier are configured to transmit all traffic to an adjacent node in the first and third network tiers via the at least one optical communications path interconnecting the nodes in the first and third network tiers, wherein the adjacent node in the first and third network tiers is part of a working path for the traffic from the nodes in the second network tier, and the nodes in the first and third network tiers are configured to transmit traffic to and receive traffic from other nodes in the first and third network tiers and the nodes in the second network tier on the at least one optical communications path interconnecting the nodes in the first and third network tiers.

3. The optical system of claim 2, wherein the first and third network tiers have different capacities.

4. The optical system of claim 2, wherein the first and third network tiers have different line rates.

5. The optical system of claim 1, further comprising a fourth network tier of nodes disposed along the optical communications paths, wherein the second network tier and fourth network tier have different hierarchical attributes, and wherein:

the nodes in the second and fourth network tiers are connected to at least one of the nodes in the first network tier via the at least one optical communications path interconnecting the nodes in the first network tier, at least some traffic between the nodes in the first network tier travels through the at least one optical communications path and through at least one of the nodes in the second and fourth network tiers without undergoing an optical-electrical-optical conversion, the nodes in the second and fourth network tiers are configured to transmit all traffic to an adjacent node in the first network tier via the at least one optical communications path interconnecting the nodes in the first network tier, wherein the adjacent node in the first network tier is part of a working path for the traffic from the nodes in the second and fourth network tiers, and the nodes in the first network tier are configured to transmit traffic to and receive traffic from other nodes in the first network tier and the nodes in the second and fourth network tiers on the at least one optical communications path interconnecting the nodes in the first network tier.

6. The optical system of claim 5, further comprising wavelengths transmitted along the optical communications paths between the nodes of the first network tier and the nodes of the second and fourth network tiers, wherein the second network tier reuses wavelengths and the fourth network tier does not reuse wavelengths.

7. The system of claim 1, wherein the at least one optical communications path is an optical fiber.

8. An optical system comprising:

a plurality of nodes in a first network tier optically interconnected by at least one optical communications path;

at least one node in a second network tier disposed along the at least one optical communications path and connected to at least one of the nodes in the first network tier, wherein:

the at least one node in the second network tier is configured to transmit all traffic to an adjacent node in the first network tier through the at least one optical communications path, wherein the adjacent node in the first network tier is part of a working path for the traffic from the nodes in the second network tier, at least some traffic between the nodes in the first network tier travels through the at least one optical communications path and through the at least one node in the second network tier without undergoing an optical-electrical-optical conversion, and the nodes in the first network tier are configured to transmit traffic to and receive traffic from other nodes in the first network tier and the at least one node in the second network tier on the at least one optical communications path interconnecting the nodes in the first network tier.

9. The optical system of claim 8, wherein the nodes in the first network tier aggregate traffic from the at least one node in the second network tier.

10. The optical system of claim 8, wherein the adjacent node in the first network tier extracts traffic destined for the at least one node in the second network tier and forwards the traffic to the at least one node in the second network tier.

11. The optical system of claim 8, further comprising wavelengths transmitted along optical communications paths between the nodes in the first network tier, wherein traffic is transmitted between a first node and a second node in the first network tier along a wavelength.

12. The optical system of claim 11, wherein traffic is transmitted between a first node in the first network tier and a second node in the first network tier along more than one wavelength.

13. The optical system of claim 12, wherein the wavelengths transmitted between the first and second nodes in the first network tier use different optical communications paths between the first and second nodes in the first network tier.

14. The optical system of claim 12, wherein the wavelengths transmitted between the first and second nodes in the first network tier use the same optical communications path between the first and second nodes in the first network tier.

15. The optical system of claim 14, wherein the wavelengths are grouped into a spectral group.

16. The optical system of claim 11, wherein traffic is transmitted along a wavelength between a first set of two nodes in the first network tier along a first path and along the same wavelength between a second set of two nodes in the first network tier along a second path where the first and second paths cover diverse paths through the-optical communications path.

17. The optical system of claim 8, wherein the node in the second network tier has a first and a second adjacent node in the first network tier and the first adjacent node in the first network tier provides a working path for the at least one node in the second network tier and the second adjacent node in the first network tier provides a protection path for the at least one node in the second network tier.

18. The system of claim 8, wherein the at least one optical communications path is an optical fiber.

19. A method for optically communicating in an optical network having first and second network tiers, wherein each of the first and second network tiers includes a plurality of nodes, interconnected by at least one optical communications path, comprising:
   receiving at a node in the first network tier all traffic from a node in the second network tier, wherein the traffic received at the node in the first network tier from the node in the second network tier traveled through the at least one optical communications path interconnecting the nodes in the first network tier, and wherein the node in the first network tier is part of a working path for the traffic from the nodes in the second network tier;
   aggregating traffic received at the node in the first network tier from the node in the second network tier;
   transmitting traffic from the node in the first network tier to another node in the first network tier, wherein at least some traffic transmitted between the nodes in the first network tier travels through the at least one optical communications path and through at least one node in the second network tier without undergoing an electrical-optical-electrical conversion.

20. The method of claim 19, wherein the node in the first network tier and the node in the second network tier are adjacent to each other.

21. The method of claim 19, wherein aggregating includes aggregating traffic into a plurality of signal channels based on traffic destination.

22. The method of claim 19, wherein receiving includes receiving at the node in the first network tier traffic from a plurality of nodes in the second network tier.

23. The method of claim 22, wherein aggregating includes aggregating traffic received at the node in the first network tier from a plurality of nodes in the second network tier.

24. The method of claim 19, wherein transmitting further includes transmitting at least one signal channel to another node in the first network tier.

25. The method of claim 19, wherein transmitting further includes transmitting at least one signal channel to a different node in the second network tier.

26. The method of claim 19, further comprising:
   receiving traffic at a node in the first network tier, wherein less than all of the traffic is destined for a node in the second network tier;
   separating at the node in the first network tier the traffic destined for the node in the second network tier;
   transmitting to the node in the second network tier the traffic destined for the node in the second network tier.

27. The method of claim 26, wherein receiving includes receiving traffic from a node in the first network tier.

28. The method of claim 26, wherein receiving includes receiving traffic from a node in the second network tier.

29. The method of claim 26 wherein:
   separating includes separating traffic destined for a plurality of nodes in the second network tier;
   transmitting includes transmitting traffic to the plurality of nodes in the second network tier.

30. The method of claim 19, further comprising:
   providing a working path between a node in the second network tier and a first adjacent node in the first network tier; and
   providing a protection path between a node in the second network tier and a second adjacent node in the first network tier.

31. The method of claim 19, wherein the at least one optical communications path is an optical fiber.

\* \* \* \* \*